(12) United States Patent
Nakamura

(10) Patent No.: US 11,619,224 B2
(45) Date of Patent: Apr. 4, 2023

(54) DEGRADATION DIAGNOSTIC DEVICE AND AIR-CONDITIONING APPARATUS

(71) Applicant: Mitsubishi Electric Corporation, Tokyo (JP)

(72) Inventor: Takaharu Nakamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 763 days.

(21) Appl. No.: 16/324,227

(22) PCT Filed: Oct. 31, 2016

(86) PCT No.: PCT/JP2016/082261
§ 371 (c)(1),
(2) Date: Feb. 8, 2019

(87) PCT Pub. No.: WO2018/078853
PCT Pub. Date: May 3, 2018

(65) Prior Publication Data
US 2019/0242375 A1    Aug. 8, 2019

(51) Int. Cl.
*F04B 51/00* (2006.01)
*F04B 49/10* (2006.01)
*F04D 27/00* (2006.01)
*F04C 28/28* (2006.01)
*G01M 7/02* (2006.01)

(52) U.S. Cl.
CPC .............. *F04B 51/00* (2013.01); *F04B 49/10* (2013.01); *F04C 28/28* (2013.01); *F04D 27/001* (2013.01); *G01M 7/02* (2013.01); *F04B 2207/70* (2013.01)

(58) Field of Classification Search
None
See application file for complete search history.

(56) References Cited

FOREIGN PATENT DOCUMENTS

| CN | 105240255 A | 1/2016 |  |
|---|---|---|---|
| DE | 202015003927 U1 * | 8/2015 | .............. F04B 37/08 |
| EP | 0280892 A2 * | 9/1988 | .............. F04C 28/28 |

(Continued)

OTHER PUBLICATIONS

Machine Translation of Lee Nam Soo (KR 20160054779) (Year: 2016).*

(Continued)

*Primary Examiner* — Matthew G Marini
(74) *Attorney, Agent, or Firm* — Posz Law Group, PLC

(57) ABSTRACT

Provided is a degradation diagnostic device, which is configured to perform a diagnosis for degradation of a compressor including a compression mechanism unit to be driven along with a rotational motion of a rotary shaft, and a shell, which is configured to form an outer casing. The degradation diagnostic device includes a vibration detection device to be fixed onto an outer wall of the shell at a position at which the compression mechanism unit is located. The vibration detection device includes: a vibration sensor, which is configured to detect vibration of the compressor; a sensor holding unit including the vibration sensor; a base portion to which the sensor holding unit is connected; and a plurality of projecting portions, which are formed on a surface of the base portion on a side opposite to the sensor holding unit and to be brought into contact with the outer wall.

20 Claims, 13 Drawing Sheets

(56) References Cited

FOREIGN PATENT DOCUMENTS

| EP | 2458214 A2 * | 5/2012 | ............ F04B 39/00 |
|---|---|---|---|
| JP | S61-207889 A | 9/1986 | |
| JP | H08-261995 A | 10/1996 | |
| JP | H09-133704 A | 5/1997 | |
| JP | H10-288379 A | 10/1998 | |
| JP | 2004-354329 A | 12/2004 | |
| JP | 2011-094920 A | 5/2011 | |
| KR | 10-2016-0054779 A | 5/2016 | |
| WO | WO-2014168937 A2 * | 10/2014 | ........... F02D 31/001 |

OTHER PUBLICATIONS

Machine translation DE 202015003927 (Year: 2015).*
Office Action dated May 19, 2020 issued in corresponding JP patent application No. 2018-547078 (and English translation).
Office Action dated Jul. 3, 2020 issued in corresponding CN patent application No. 201680090196.5 (and English translation).
Office Action dated Jan. 28, 2020 issued in corresponding JP patent application No. 2018-547078 (and English translation).
International Search Report of the International Searching Authority dated Dec. 20, 2016 for the corresponding International application No. PCT/JP2016/082261 (and English translation).
Chinese Office Action dated Dec. 14, 2020, issued in corresponding CN Patent Application No. 201680090196.5 (and English Machine Translation).
Office Action dated Nov. 13, 2019 issued in corresponding CN patent application No. 201680090196.5 (and English translation).
Extended European Search Report dated Aug. 8, 2019 issued in corresponding EP patent application No. 16919783.7.

* cited by examiner

DEGRADATION DIAGNOSTIC DEVICE AND AIR-CONDITIONING APPARATUS

CROSS REFERENCE TO RELATED APPLICATION

This application is a U.S. national stage application of International Application No. PCT/JP2016/082261, filed on Oct. 31, 2016, the contents of which are incorporated herein by reference.

Technical Field

The present invention relates to a degradation diagnostic device, which is configured to diagnose degradation of a compressor, and to an air-conditioning apparatus.

Background

Hitherto, there has been proposed a technology of predicting an abnormality or a failure which may occur in a constituent device from data indicative of an operating state of an air-conditioning apparatus and applying the predicted abnormality or failure to stabilization of an operation of the air-conditioning apparatus (see, for example, Patent Literature 1 and Patent Literature 2). Patent Literature 1 discloses a technology of predicting a lifetime of a compressor based on a vibration detection value obtained by an acceleration sensor that is mounted to a leg portion of the compressor. An air-conditioning apparatus disclosed in Patent Literature 2 includes a terminal cover provided on a peripheral surface of a shell of a compressor and stops the compressor when a vibration detection value obtained by an acceleration sensor provided inside the terminal cover indicates an abnormality.

PATENT LITERATURE

Patent Literature 1: Japanese Unexamined Patent Application Publication No. Hei 10-288379
Patent Literature 2: Japanese Unexamined Patent Application Publication No. 2011-94920

However, the leg portion of the compressor is located at a position to which vibration of the compressor caused by, for example, a rotational motion of a compression mechanism unit is unlikely to be transmitted. Further, the terminal cover that covers a power supply connection portion is generally provided at a position to which the vibration of the compressor is unlikely to be transmitted. In addition, the terminal cover has low fixation strength. Thus, for example, noise tends to be mixed with the vibration detection value obtained by the acceleration sensor that is provided inside the terminal cover. Therefore, there is a problem in detection accuracy.

Specifically, with the technologies disclosed in Patent Literature 1 and Patent Literature 2, the vibration caused by, for example, the rotational motion of the compression mechanism unit cannot be detected with high accuracy. Therefore, a problem arises that a degree of degradation of the compressor cannot be precisely diagnosed.

SUMMARY

The present invention has been made to solve the problems described above, and an object thereof is to provide a degradation diagnostic device, which is capable of detecting vibration caused by, for example, a rotational motion of a compression mechanism unit with high accuracy to perform a highly accurate degradation diagnosis for a compressor, and an air-conditioning apparatus.

According to one embodiment of the present invention, there is provided a degradation diagnostic device configured to perform a diagnosis for degradation of a compressor including a compression mechanism unit to be driven along with a rotational motion of a rotary shaft and a shell forming an outer casing, the degradation diagnostic device including a vibration detection device to be fixed onto an outer wall of the shell at a position at which the compression mechanism unit is located, in which the vibration detection device includes: a vibration sensor configured to detect vibration of the compressor; a sensor holding unit including the vibration sensor; a base portion to which the sensor holding unit is connected; and a plurality of projecting portions formed on a surface of the base portion on a side opposite to the sensor holding unit and to be brought into contact with the outer wall.

According to one embodiment of the present invention, there is provided an air-conditioning apparatus, including: a refrigeration cycle, through which refrigerant circulates, the refrigeration cycle being formed by connecting, by a refrigerant pipe, a compressor, which includes a compression mechanism unit to be driven along with a rotational motion of a rotary shaft and is configured to compress the refrigerant, a heat source-side heat exchanger configured to exchange heat between a heat medium and the refrigerant, a pressure reducing device, which is configured to regulate a flow rate of the refrigerant, and a use-side heat exchanger configured to exchange heat between an indoor air and the refrigerant; and the degradation diagnostic device described above.

According to one embodiment of the present invention, the sensor holding unit including the vibration sensor is formed integrally with the plurality of projecting portions which are brought into contact with the outer wall of the shell at the position at which the compression mechanism unit is located. Therefore, the vibration caused by, for example, the rotational motion of the compression mechanism unit can be detected by the vibration sensor with high accuracy. Thus, the highly accurate degradation diagnosis for the compressor can be performed.

DETAILED DESCRIPTION

Embodiment 1

Figure 1:
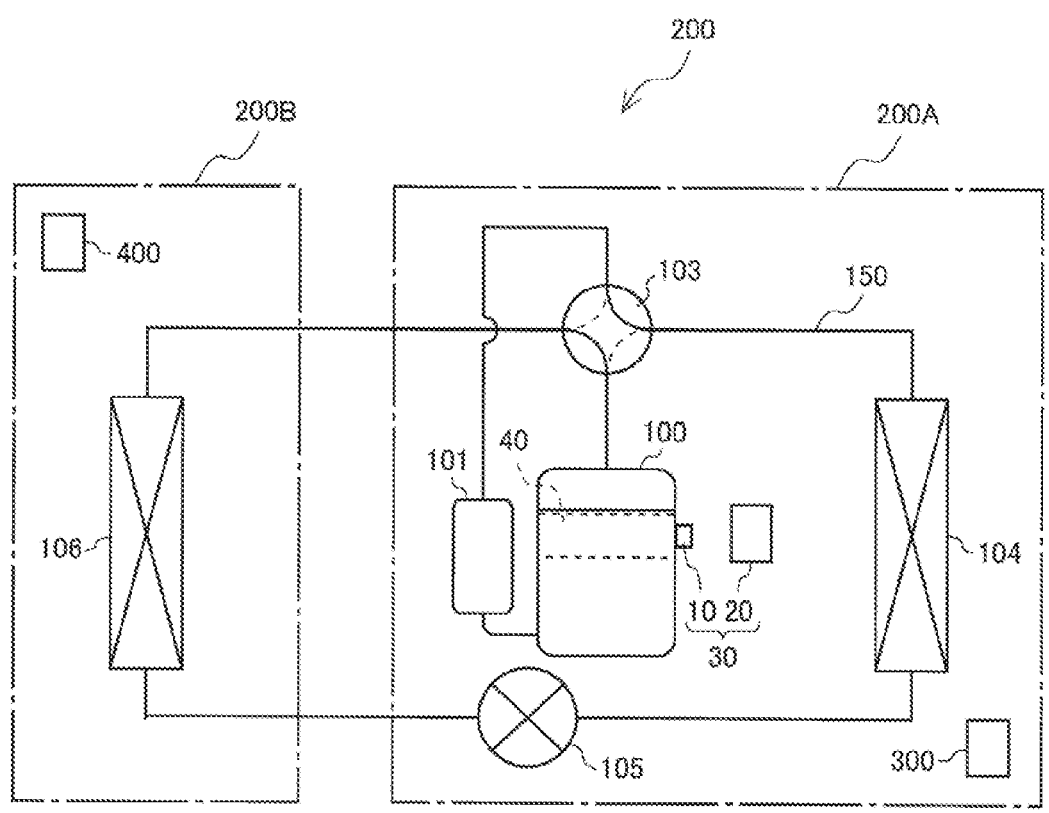
FIG. 1 is a configuration diagram of an air-conditioning apparatus and a degradation diagnostic device according to Embodiment 1 of the present invention.

FIG. 1 is a configuration diagram of an air-conditioning apparatus and a degradation diagnostic device according to Embodiment 1 of the present invention. As illustrated in FIG. 1, an air-conditioning apparatus 200 includes an outdoor unit 200A, which is installed outdoors, and an indoor unit 200B, which is installed indoors. The outdoor unit 200A includes a compressor 100, a suction muffler 101 connected to a suction side of the compressor 100, and a four-way valve 103 connected to a discharge side of the compressor 100. The outdoor unit 200A includes a heat source-side heat exchanger 104, which is formed of, for example, a fin-and-tube type heat exchanger and is configured to exchange heat between an outdoor air and refrigerant, and a pressure reducing device 105, which is formed of, for example, an electric expansion valve and is configured to regulate a flow rate of the refrigerant. The indoor unit 200B includes a use-side heat exchanger 106, which is formed of, for example, a fin-and-tube type heat exchanger and is configured to exchange heat between an indoor air and the refrigerant. Specifically, the air-conditioning apparatus 200 has a refrigeration cycle through which the refrigerant circulates, which is formed by connecting the compressor 100, the suction muffler 101, the four-way valve 103, the heat source-side heat exchanger 104, the pressure reducing device 105, and the use-side heat exchanger 106 by a refrigerant pipe 150.

The compressor 100 is configured to suck refrigerant in a low-pressure gaseous state and compress the refrigerant into refrigerant in a high-pressure gaseous state. The compressor 100 may be one which is capable of appropriately changing an operating frequency by inverter control or may be operated at a constant velocity without a function of changing the operating frequency. As the compressor 100, various compressors such as a scroll-type compressor, a rotary-type compressor, a reciprocating-type compressor, a helical-type compressor, and a turbo-type compressor can be adopted. The four-way valve 103 is configured to switch flow of the refrigerant from the compressor 100. The four-way valve 103 is, for example, connected to a side indicated by the solid line of FIG. 1 during a heating operation and is connected to a side indicated by the broken line of FIG. 1 during a cooling operation.

The outdoor unit 200A includes a controller 300, which is configured to control the refrigeration cycle. Specifically, the controller 300 is configured to control, for example, the operation frequency of the compressor 100, processing for switching the four-way valve 103, and an opening degree of the pressure reducing device 105. The outdoor unit 200A includes a degradation diagnostic device 30. The degradation diagnostic device 30 includes a vibration detection device 10 and a diagnostic processing device 20.

The vibration detection device 10 and the diagnostic processing device 20 are connected in a wired or wireless manner. Specifically, the diagnostic processing device 20 is configured to acquire vibration detection values detected by a first vibration sensor 12a and a second vibration sensor 12b in a wired or wireless manner from the vibration detection device 10. The indoor unit 200B includes a display unit 400, which is formed of, for example, a liquid crystal display (LCD).

Figure 2:
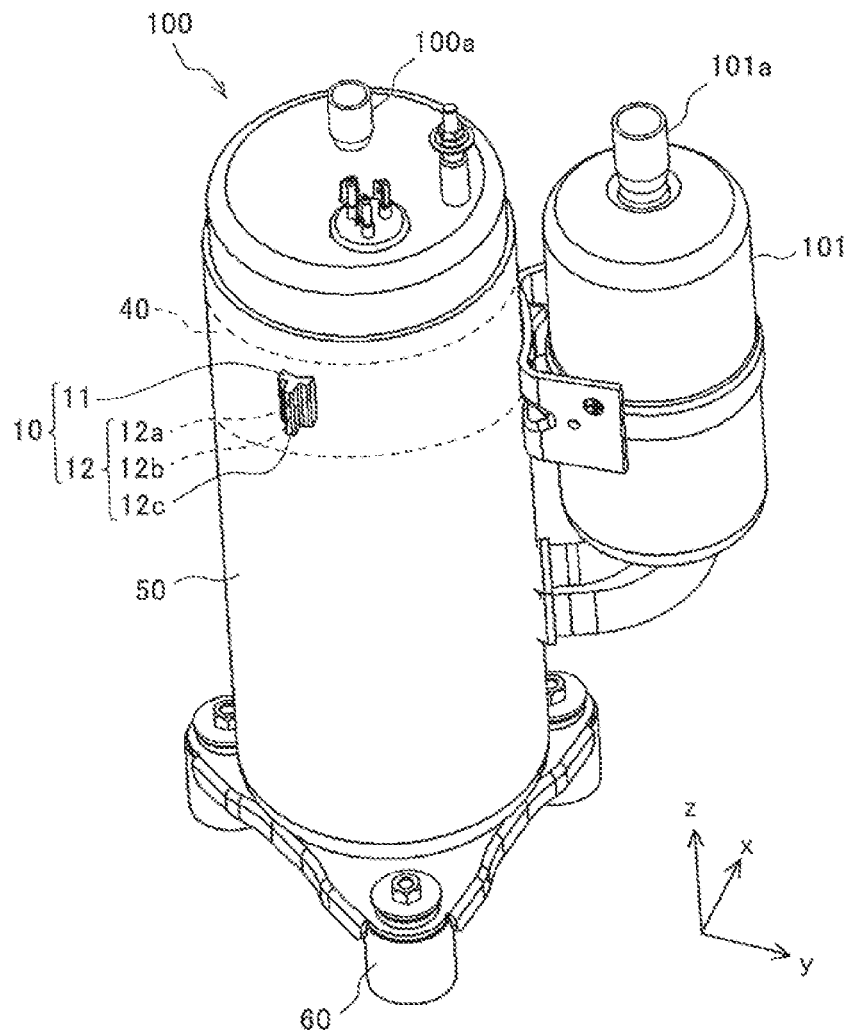
FIG. 2 is an external view illustrating a compressor and a vibration detection device of FIG. 1.
Figure 3:
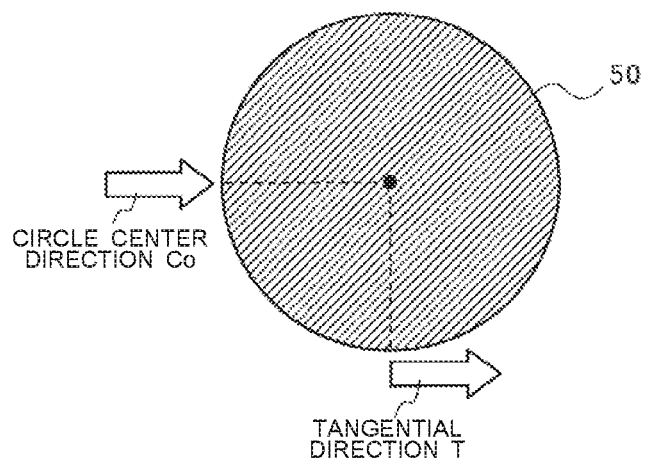
FIG. 3 is an explanatory view schematically illustrating a cross section of a compression mechanism unit and a shell of FIG. 2, which is taken along an xy plane.

FIG. 2 is an external view illustrating the compressor and the vibration detection device of FIG. 1. FIG. 3 is an explanatory view schematically illustrating a cross section of a compression mechanism unit and a shell of FIG. 2, which is taken along an xy plane. As illustrated in FIG. 2, the compressor 100 includes a shell 50 and a leg portion 60. The shell 50 forms an outer casing of the compressor 100. The compressor 100 includes a compression mechanism unit 40, which is driven along with a rotational motion of a rotary shaft (not shown), inside the shell 50. The compression mechanism unit 40 is coupled to an electric motor (not shown) through intermediation of the rotary shaft. The rotary shaft transmits a rotational force of the electric motor to the compression mechanism unit 40. A discharge pipe 100a is provided to the compressor 100, whereas a suction pipe 101a is provided to the suction muffler 101.

The compression mechanism unit 40 is vibrated by a rotational motion or a reciprocating motion of an internal movable component, and the vibration thereof is transmitted to the shell 50. The vibration of the compression mechanism unit 40 is more intensely transmitted to a portion of the shell 50, which is positioned on an outer periphery of the compression mechanism unit 40. The compression mechanism unit 40 repeats a predetermined motion pattern in a given cycle. Therefore, a vibration pattern generated due to the motion of the movable component of the compression mechanism unit 40 is transmitted to the shell 50. Thus, the vibration detection device 10 is fixed to an outer wall of the shell 50 at a position at which the compression mechanism unit 40 is located, as illustrated in FIG. 2.

The vibration detection device 10 includes a sensor holding unit 12, which includes the first vibration sensor 12a, the second vibration sensor 12b, and a holding member 12c. Specifically, the sensor holding unit 12 includes the first vibration sensor 12a and the second vibration sensor 12b, which are provided to the holding member 12c. The vibration detection device 10 includes a mounting portion 11, which is connected to the sensor holding unit 12. The mounting portion 11 is located on a side close to the compressor 100 with respect to the sensor holding unit 12 under a state in which the vibration detection device 10 is fixed to the compressor 100.

The first vibration sensor 12a and the second vibration sensor 12b are arranged so that a vibration detection direction matches a direction of the operation of the movable component of the compression mechanism unit 40. The direction of the operation of the movable component of the compression mechanism unit 40 includes a tangential direction T, which is a direction of a tangent of a rotation trajectory of the compression mechanism unit 40, and a circle center direction Co, which is a direction from the outer wall of the shell 50 toward a center of the compression mechanism unit 40. The first vibration sensor 12a is arranged so that the vibration detection direction matches the tangential direction T. The second vibration sensor 12b is arranged so that the vibration detection direction matches the circle center direction Co.

Specifically, the first vibration sensor 12a detects vibration along the tangential direction T of the compressor 100, which is caused by the rotational motion of the movable component of the compression mechanism unit 40, as a first vibration detection value. The second vibration sensor 12b detects vibration along the circle center direction Co of the compressor 100, which is caused by the reciprocating motion of the movable component of the compression mechanism unit 40, as a second vibration detection value.

In FIG. 2, the tangential direction T is parallel to a y-axis direction, the circle center direction Co is parallel to an x-axis direction, and an axial direction of the rotary shaft corresponds to a z-axis direction. The same applies to the drawings referred to below. As illustrated in FIG. 3, the tangential direction T is a direction orthogonal to a diametrical direction of the shell 50 on an xy cross section, whereas the circle center direction Co corresponds to the diametrical direction of the shell 50 on the xy cross section.

The first vibration sensor 12a and the second vibration sensor 12b are semiconductor-type micro electro mechanical system (MEMS) sensors, which are included in acceleration sensors configured to detect a vibrational acceleration. In particular, in Embodiment 1, capacitive type or piezoresistive type MEMS sensors are used as the first vibration sensor 12a and the second vibration sensor 12b in view of a degree of increase in surface temperature of the shell 50.

Figure 4:
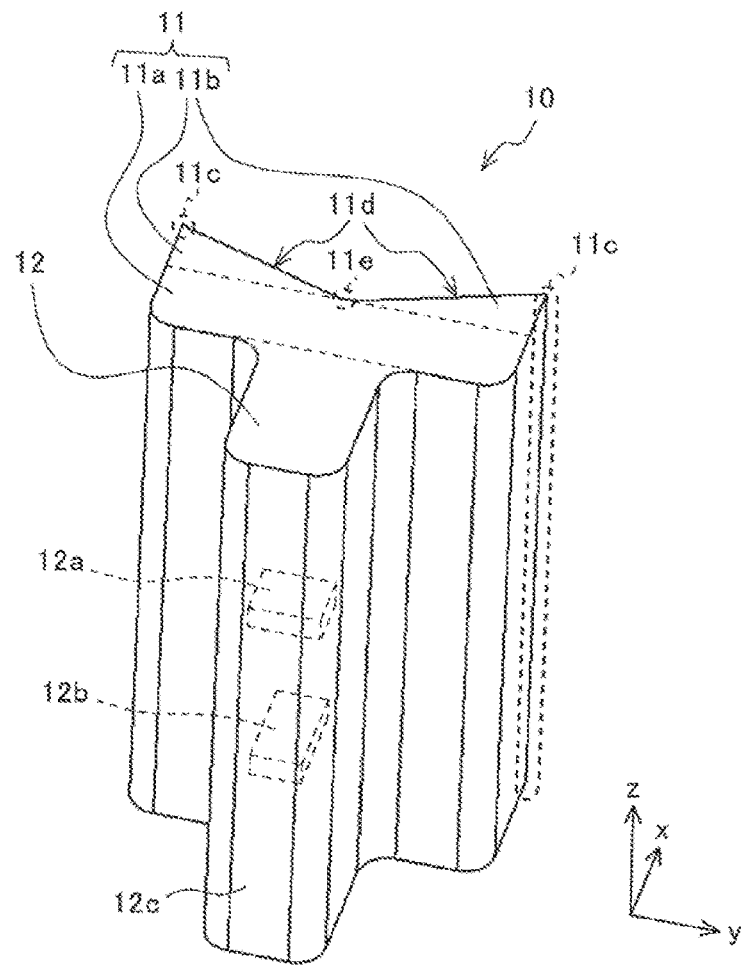
FIG. 4 is an enlarged perspective view illustrating the vibration detection device of FIG. 2.
Figure 5:
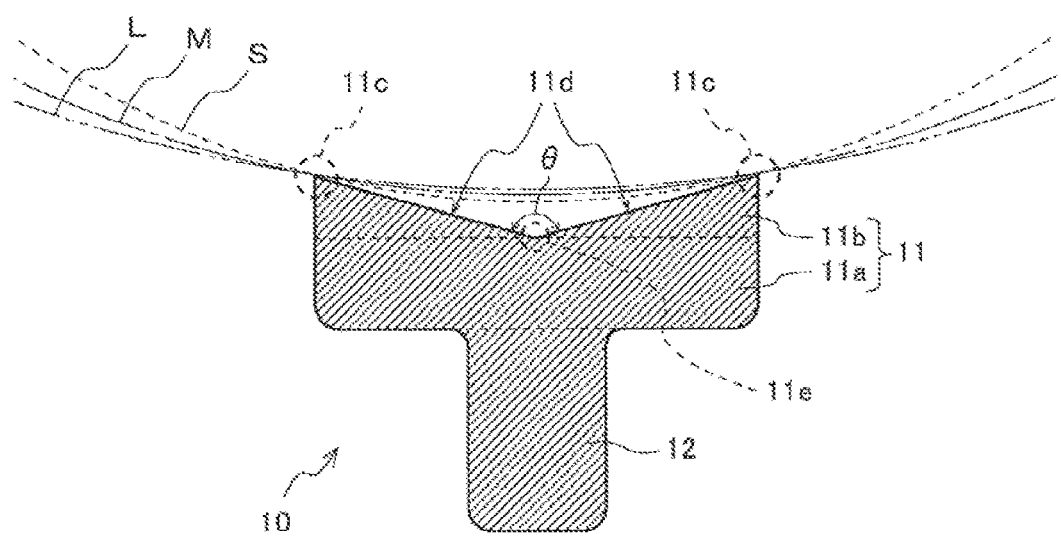
FIG. 5 is a schematic sectional view illustrating a state in which the vibration detection device of FIG. 4 is taken along the xy plane.

FIG. 4 is an enlarged perspective view illustrating the vibration detection device 10 of FIG. 2. FIG. 5 is a schematic sectional view illustrating a state in which the vibration detection device 10 of FIG. 4 is taken along the xy plane. A specific structure of the vibration detection device 10 is described with reference to FIG. 4 and FIG. 5. The holding member 12c is formed into a cuboidal shape of which the z-axis direction is the longitudinal direction. The mounting portion 11 includes a base portion 11a connected to the holding member 12c and two projecting portions 11b provided on a surface of the base portion 11a, which is located on a side opposite to the holding member 12c.

In an example of FIG. 4 and FIG. 5, a central portion of the base portion 11a in the y-axis direction is connected to the holding member 12c. Specifically, the base portion 11a is formed into a cuboidal shape of which the z-axis direction is the longitudinal direction and the length in the y-axis direction is larger than that of the holding member 12c. Each of the projecting portions 11b has an inner wall 11d, which is located on a side opposite to the sensor holding unit 12. The two projecting portions 11b form, with the respective inner walls 11d, a V-shaped outer wall on the xy cross section. Specifically, each of the projecting portions 11b is formed into a triangular prism shape of which the z-axis direction is a longitudinal direction. In the example of FIG. 4 and FIG. 5, the projecting portion 11b has a right triangular xy cross section having the inner wall 11d as a hypotenuse.

A magnet, which fixes the vibration detection device 10 to the shell 50, is embedded in the mounting portion 11. For example, when a weight of the vibration detection device 10 is in a range of from 2 g to 10 g, a magnet having a magnetic force ranging from about 11 N to about 53 N is only required to be used. In this manner, the vibration detection device 10 can be fixed to the compressor 100 under a state in which distal end portions 11c are held in contact with the outer wall of the shell 50.

A magnet may be embedded partly, not entirely, in the mounting portion 11 as long as the magnetic force sufficient for stably fixing the vibration detection device 10 to the shell 50 can be obtained. For example, a magnet may be provided in each of the two projecting portions 11b. As the magnet, a sheet-shaped magnet or a rod-shaped magnet may be adopted. In this case, it is preferred that the magnet be embedded in a main body of the mounting portion 11 so that a longitudinal direction of the magnet matches a longitudinal direction of the mounting portion 11.

In recent year, an acceleration sensor, which has a high heat resistance, high detection accuracy, and a small size, and is inexpensive as compared to those in the related art, has been developed. Accordingly, the vibration detection device 10, which is lightweight as in the example described above, can be formed. Thus, the vibration detection device 10 can be easily fixed onto the outer wall of the shell 50 at the position at which the compression mechanism unit 40 is located for use.

The main body of the mounting portion 11 and the holding member 12c are made of engineering plastic or fiber-reinforced plastic, which is excellent in performance such as a mechanical strength, a heat resistance, and a wear resistance as compared to those of commodity plastics. The low-pressure shell type compressor 100 has a lower surface temperature than a surface temperature of the high-pressure shell type compressor 100. Therefore, when the vibration detection device 10 is mounted to the low-pressure shell type compressor 100, the main body of the mounting portion 11 and the holding member 12c can be made of plastic having a relatively low heat resistance. It is apparent that the mounting portion 11 and the holding member 12c may be made of different materials. For example, the mounting portion 11 may be formed entirely of a magnet. Alternatively, each of the two projecting portions 11b of the mounting portion 11 may be formed of a magnet.

In Embodiment 1, a central angle θ, which is an angle formed between the inner walls 11d of the two projecting portions 11b, is set based on curvatures of the shells 50 of various types of the compressors 100. More specifically, when a center of the shell 50 is a center O for the compressors 100 having various sizes, to which the vibration detection device 10 is supposed to be fixed, the central angle θ is set so that a distance between the center O and each of the distal end portions 11c becomes equal to or smaller than a distance between the center O and a central portion 11e.

In FIG. 5, an outer wall S, an outer wall M, and an outer wall L are exemplified as the outer walls of the shells 50, which have different curvatures, specifically, different diameters. The diameters of the shells 50 increase in the order of the outer wall S, the outer wall M, and the outer wall L. As illustrated in FIG. 5, both of the distal end portions 11c of the two projecting portions 11b are held in contact with each of the outer wall S, the outer wall M, and the outer wall L. Specifically, under a state in which the vibration detection device 10 is fixed to the compressor 100, the distal end portions 11c of the two projecting portions 11b are held in contact with the outer wall of the shell 50 of every diameter. Therefore, the vibration detection device 10 can be mounted to various compressors 100 having different sizes for use.

Further, the distal end portion 11c of each of the projecting portions 11b has a pointed shape. Specifically, the distal end portion 11c is formed so as to be held in linear contact with the shell 50 along the axial direction of the rotary shaft under a state in which the mounting portion 11 is fixed to the shell 50. Therefore, dew condensation generated on a surface of the compressor 100 flows from a portion in which the projecting portions 11b are not held in contact with the shell 50. Therefore, adhesion of the dew condensation to the first vibration sensor 12a and the second vibration sensor 12b can be prevented. Specifically, the vibration detection device 10 is fixed to the compressor 100 under a state in which the distal end portions 11c located at the distal ends of the mounting portion 11 are held in contact with the shell 50. Therefore, in particular, in a case where the first vibration sensor 12a and the second vibration sensor 12b are connected to the diagnostic processing device 20 through a communication line or other measures, a failure of the first vibration sensor 12a and the second vibration sensor 12b or other defects due to intrusion of the dew condensation can be prevented. In this case, the distal end portions 11c may be formed smoothly and rounded. Even with such a shape, the mounting portion 11 of the vibration detection device 10 can be fixed to the shell 50 under a state in which the distal end portions 11c are held in linear contact with the shell 50 along the axial direction of the rotary shaft. Therefore, the adhesion of the dew condensation to the first vibration sensor 12a and the second vibration sensor 12b can be prevented.

Further, each of the first vibration sensor 12a and the second vibration sensor 12b is provided so that the vibration detection direction is at a right angle relative to the distal end portions 11c formed along the axial direction of the rotary shaft. Therefore, through the contact of the distal end portions 11c with the shell 50 along the axial direction of the rotary shaft, the first vibration sensor 12a can detect the vibration along the tangential direction T and the second vibration sensor 12b can detect the vibration along the circle center direction Co.

Figure 6:
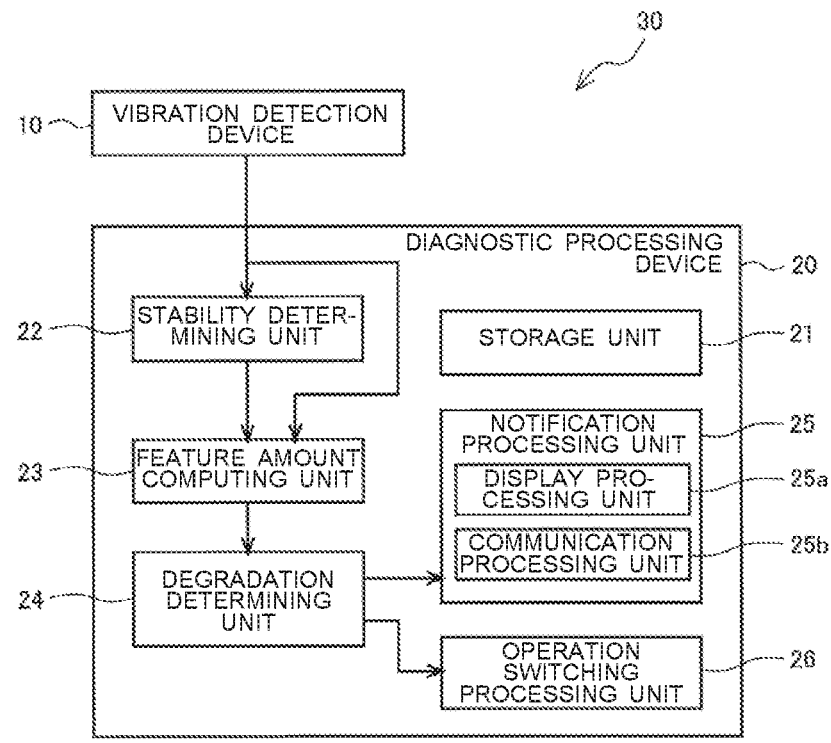
FIG. 6 is a block diagram illustrating a functional configuration of a diagnostic processing device of FIG. 1.

FIG. 6 is a block diagram illustrating a functional configuration of the diagnostic processing device 20 of FIG. 1. As illustrated in FIG. 6, the diagnostic processing device 20 includes a storage unit 21, a stability determining unit 22, a feature amount computing unit 23, a degradation determining unit 24, a notification processing unit 25, and an operation switching processing unit 26. In the storage unit 21, an operation program and various control parameters for the diagnostic processing device 20 and other data are stored. In the storage unit 21, for example, one or a plurality of degradation threshold values each serving as a standard of degradation determination of the compressor 100 by the degradation determining unit 24 are stored.

The stability determining unit 22 is configured to determine whether or not a state of the air-conditioning apparatus 200 has been stabilized. For example, the stability determining unit 22 may determine whether or not the state of the air-conditioning apparatus 200 has been stabilized by determining whether or not a rotation speed of the compressor 100 has become constant. Alternatively, the stability determining unit 22 may determine whether or not the state of the air-conditioning apparatus 200 has been stabilized by determining whether or not a state of the refrigeration cycle has been maintained in the same state for a preset time period or longer. In this case, the state of the refrigeration cycle includes a state such as a temperature and a pressure of the refrigerant circulating through the refrigeration cycle. The preset time period is set to, for example, three minutes. The stability determining unit 22 may determine stability of the state of the air-conditioning apparatus 200 with use of at least one of the first vibration detection value and the second vibration detection value.

The feature amount computing unit 23 is configured to compute a feature amount indicative of the state of the compressor 100 with use of at least one of the first vibration detection value detected by the first vibration sensor 12a and the second vibration detection value detected by the second vibration sensor 12b. The feature amount computing unit 23 has a function of computing a plurality of different feature amounts at the same timing. The feature amount computing unit 23 can compute, for example, a standard deviation, a median, an average value, a peak value, an impact index, a form factor, a peak-to-rms ratio, a skewness, a kurtosis, an extreme value of the skewness, an extreme value of the kurtosis, an extreme value of the average value, an average frequency, a crossover frequency, or an extreme value frequency as the feature amount. When obtaining the extreme value of the skewness, the extreme value of the kurtosis, or the extreme value of the average value as the feature amount, the feature amount computing unit 23 uses a maximum value or a minimum value as the extreme value. The feature amount computing unit 23 can compute a level of a rotational load of the compressor 100, a level of a frequency of a result of FFT analysis of the vibration detection value in the tangential direction T, or other levels as the feature amount. A feature of the vibration in the tangential direction T appears in the feature amount that is computed based on the first vibration detection value, and a feature of the vibration in the circle center direction Co appears in the feature amount that is computed based on the second vibration detection value. The feature amount computing unit 23 has a function of outputting the computed feature amount to the degradation determining unit 24.

The degradation determining unit 24 determines a kind of degradation and a degree of degradation of the compressor 100 based on the feature amount that is computed in the feature amount computing unit 23. When the plurality of different feature amounts are input at the same timing from the feature amount computing unit 23, the degradation determining unit 24 has a function of determining the degradation with use of the feature amounts in combination. The degradation determining unit 24 may determine the degradation of the compressor 100 with use of data indicative of, for example, the operating state of the compressor 100 together with the feature amounts.

The degradation threshold value to be used by the degradation determining unit 24 for the degradation determination may be calculated from, for example, data obtained by a learning operation that is performed to acquire one or a plurality of values of feature amounts for each preset rotation speed of the compressor 100 in an initial period of the operation of the air-conditioning apparatus 200. Alternatively, the degradation threshold value may be obtained from the value of the feature amount obtained for a given time period by performing a normal operation over the given time period. Further, after a condensing temperature, an evaporating temperature, and the rotation speed of the compressor 100 are preset, the vibration may be detected for the compressor 100 alone so as to obtain the degradation threshold value from a result of the detection of vibration. Then, through comparison of the obtained degradation threshold value and mapped values with each other, the degradation threshold values under various conditions may be set.

A kind of degradation and a degree of degradation concerning the degradation determination by the degradation determining unit 24 are now specifically exemplified. As kinds of degradation of the compressor 100 to be determined by the degradation determining unit 24, there are exemplified liquid backflow in the compressor 100 and damage of a sliding portion of the compression mechanism unit 40. For example, when the level of the rotational load of the compressor 100 linearly increases or suddenly rises with elapse of time, it is considered that the sliding portion of the compression mechanism unit 40 may be damaged to increase a frictional resistance. Specifically, the degradation determining unit 24 can perform a determination about a degree of damage of the sliding portion based on a variation of the level of the rotational load of the compressor 100 with time.

Whether or not the sliding portion is damaged can also be determined by detecting an increase in input to the compressor 100 or a decrease in cooling capacity or heating capacity. However, a state in which the sliding portion is damaged to such a degree that the input to the compressor 100 increases or the cooling capacity or other capacities decrease corresponds to a state, for example, immediately before stop of the functions of the compressor 100. Specifically, when the compressor 100 is operated until the above-mentioned state is brought about, it undesirably becomes difficult or impossible to repair the compressor 100.

Meanwhile, the degradation diagnostic device 30 according to Embodiment 1 performs the degradation diagnosis with use of the feature amount that is computed based on the vibration detection value detected by the vibration sensor. Therefore, when, for example, the level of the rotational load of the compressor 100 varies in a cycle of several revolutions, it can be estimated that sucked refrigerant in the compressor 100 is flowing backward. When the level of the rotational load of the compressor 100 exceeds the degradation threshold value, the degradation diagnostic device 30 can determine through the degradation determining unit 24 that the sliding portion of the compression mechanism unit 40 is damaged. Specifically, with the degradation diagnostic device 30, a sign of the failure can be detected with high accuracy with use of a variation in feature amount with time. Therefore, such a situation that it may become difficult to repair the compressor 100 can be prevented.

The following method is also conceivable as a method of determining whether or not the liquid backflow has occurred. Specifically, for example, the following method can be adopted. A ratio of an average of peak values for ten revolutions of the compressor 100 and a maximum value during the ten revolutions of the compressor 100 is stored. When the ratio becomes larger than a ratio serving as a reference, it is determined that the sucked refrigerant in the compressor 100 is flowing backward.

When a level of a frequency of an n-th order or a level of a frequency of an order other than the n-th order of a result of fast Fourier transform (FFT) analysis of the vibration of the compressor 100 in the tangential direction T increases as compared to the degradation threshold value, it is considered that an abnormality of such a degree that affects the variation in torque during one revolution of the compressor 100 has occurred in the sliding portion. In particular, when microflaws are generated at a plurality of positions on the sliding portion of the compression mechanism unit 40, the frictional resistance due to the plurality of microflaws is generated for a plurality of times during one revolution of the sliding portion. Therefore, when there is a difference from a normal value at a frequency component that is higher than the frequency of the compressor 100, it is considered that the microflaws are generated on the sliding portion. Therefore, when a difference from the normal value becomes larger than a given amount at the frequency component that is higher than the frequency of the compressor 100, the degradation determining unit 24 is only required to determine that the microflaws are generated on the sliding portion.

In addition, when an impact component is mixed into the vibration detection value, for example, a value of the peak-to-rms ratio increases. Therefore, when the value of the peak-to-rms ratio becomes larger than a given value, it is considered that lubrication at the sliding portion of the compression mechanism unit 40 becomes insufficient, resulting in damage of the sliding portion. Therefore, for example, the peak-to-rms ratio may be computed by the feature amount computing unit 23 as the feature amount from a vibrational acceleration in the tangential direction T and a vibrational acceleration in the circle center direction Co so that, when the peak-to-rms ratio computed in the feature amount computing unit 23 exceeds the degradation threshold value, the degradation determining unit 24 determines that the sliding portion is damaged.

The notification processing unit 25 is configured to externally notify a result of determination performed by the degradation determining unit 24. In an example of FIG. 6, the notification processing unit 25 includes a display processing unit 25a and a communication processing unit 25b. The display processing unit 25a is configured to display information indicative of the result of determination performed by the degradation determining unit 24 on the display unit 400. The communication processing unit 25b is configured to communicate with a communication device (not shown) such as a computer provided to a remote monitoring destination in a wired or wireless manner. As the remote monitoring destination, for example, a monitoring center, which is configured to monitor and control the operating state of the air-conditioning apparatus 200, is assumed. The communication processing unit 25b has a function of transmitting the information indicative of the result of determination performed by the degradation determining unit 24 to the communication device provided to the remote monitoring source.

The operation switching processing unit 26 switches a control state of the compressor 100 from normal operation control to life extension operation control when the degree of degradation of the compressor 100 exceeds a given reference. Specifically, the operation switching processing unit 26 transmits a life extension operation command to the controller 300 in accordance with the result of determination performed by the degradation determining unit 24, specifically, in accordance with the degree of degradation of the compressor 100. The life extension operation command is a signal indicative of a reduction amount in operating frequency of the compressor 100, and includes not only a signal for an instruction about an eighty-percent decrease in operating frequency of the compressor 100 but also a signal for an instruction about stop of the compressor 100. The reduction amount in operating frequency of the compressor 100 is preset in accordance with the kind of degradation and the degree of degradation of the compressor 100. For example, a reduction-amount table in which the degree of degradation of the compressor 100 and the reduction amount in operating frequency are associated with each other may be stored in the storage unit 21 so that the operation switching processing unit 26 generates the life extension operation command with reference to the reduction-amount table. It is preferred that the reduction-amount table be set so that the reduction amount in operating frequency increases as the degradation of the compressor 100 proceeds.

The controller 300 has a function of decreasing the operating frequency of the compressor 100 or stopping the compressor 100 in accordance with the life extension operation command transmitted from the operation switching processing unit 26. It is apparent that the operation switching processing unit 26 may have a function of controlling the compressor 100. The operation switching processing unit 26 may decrease the operating frequency of the compressor 100 or stop the compressor 100 in accordance with the result of determination performed by the degradation determining unit 24.

The indoor unit 200B includes a speaker and may include an output unit configured to output a sound or a voice. The display processing unit 25a may include an output processing unit, which transmits information indicative of occurrence of damage to the output unit when the degradation of the compressor 100 is serious and it is determined in the degradation determining unit 24 that the damage has occurred in the compressor 100. Then, the output unit may output a sound or a voice based on the information indicative of the occurrence of damage, which has been transmitted from the output processing unit. In this case, the notification processing unit 25 may include at least one of the display processing unit 25a, the communication processing unit 25b, and the output processing unit.

The diagnostic processing device 20 may be configured without the degradation determining unit 24 so that, for example, the communication processing unit 25b transmits the feature amount computed in the feature amount computing unit 23 to the external communication device. In this manner, the degradation of the compressor 100 can be diagnosed at the remote monitoring source or other locations with use of the feature amount transmitted from the diagnostic processing device 20. The diagnostic processing device 20 may also be configured without the feature amount computing unit 23 and the degradation determining unit 24 so that, for example, the communication processing unit 25b transmits the vibration detection value detected in the vibration detection device 10 to the external communication device. In this manner, the feature amount can be computed based on the vibration detection value transmitted from the diagnostic processing device 20 at the remote monitoring source or other locations so that the degradation of the compressor 100 is diagnosed with use of the computed feature amount. Further, the diagnostic processing device 20 may be configured without the operation switching processing unit 26.

The vibration detection device 10 and the diagnostic processing device 20 may be formed integrally. Specifically, the diagnostic processing device 20 may be provided to the base portion 11a or to the sensor holding unit 12. The base portion 11a is desired to include a power supply unit, which is configured to supply power to the vibration detection device 10 and the diagnostic processing device 20. In this manner, the degradation diagnostic device 30 may be operated alone. When the communication processing unit 25b has a wireless communication function, the diagnostic processing device 20 may wirelessly transmit information such as the feature amount or the result of degradation determination to the external communication device.

The diagnostic processing device 20 can be achieved with hardware such as a circuit device which achieves each of the functions described above or can be achieved as software to be executed on a computing device such as a microcomputer, a digital signal processor (DSP), or a central processing unit (CPU). The storage unit 21 may be formed of, for example, a random access memory (RAM) and a read only memory (ROM), a programmable ROM (PROM) such as a flash memory, or a hard disk drive (HDD).

Figure 7:
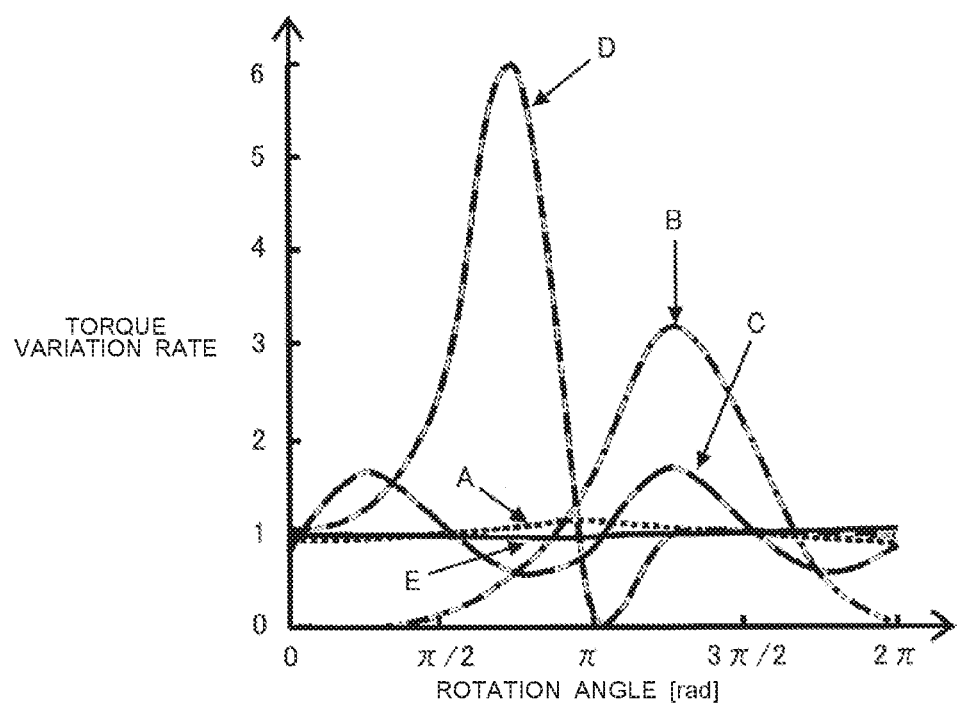
FIG. 7 is a graph showing a variation rate of a load torque during one revolution for each type of a compressor.

FIG. 7 is a graph for showing a variation rate of a load torque during one revolution for each type of the compressor. In FIG. 7, the horizontal axis represents a rotation angle [rad], whereas the vertical axis represents the variation rate of the load torque. In this manner, variations of the load torques of the compressors 100 of the respective types are compared to each other. In FIG. 7, a line graph A shows a characteristic of a scroll-type compressor, a line graph B shows a characteristic of a single rotary-type compressor, and a line graph C shows a characteristic of a twin rotary-type compressor. A line graph D shows a characteristic of a reciprocating-type compressor, and a line graph E shows a characteristic of a helical-type compressor. In this manner, the compressor 100 has a feature in a load torque pattern during one revolution in accordance with each of the types.

Figure 8:
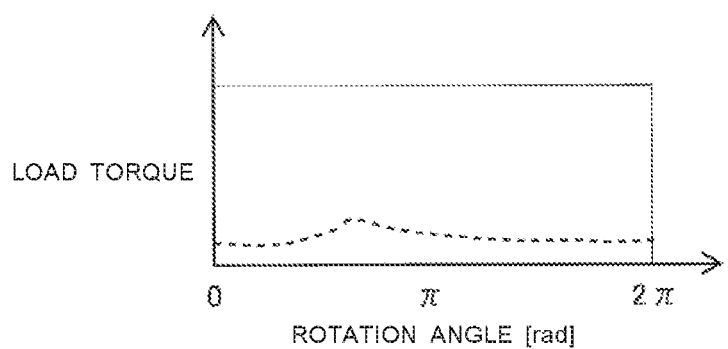
FIG. 8 is a graph showing the load torque when a scroll-type compressor is normal.
Figure 9:
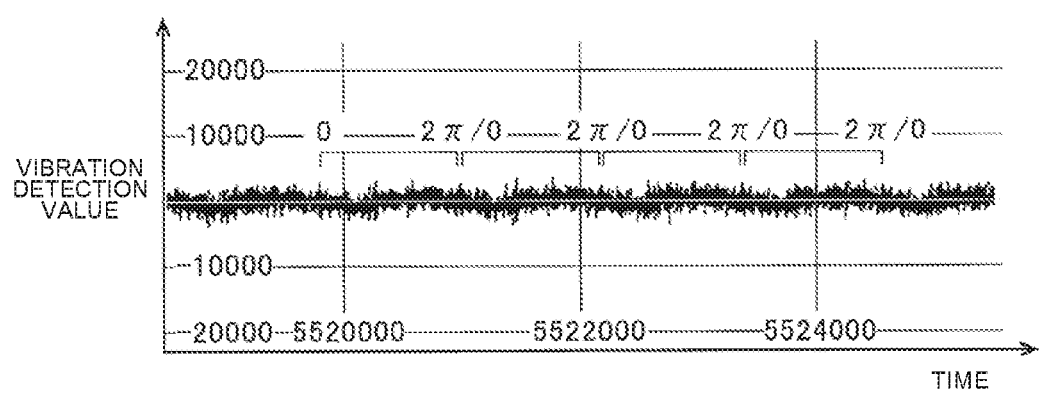
FIG. 9 is a graph showing a vibration detection value in a tangential direction T when the scroll-type compressor is normal.
Figure 10:
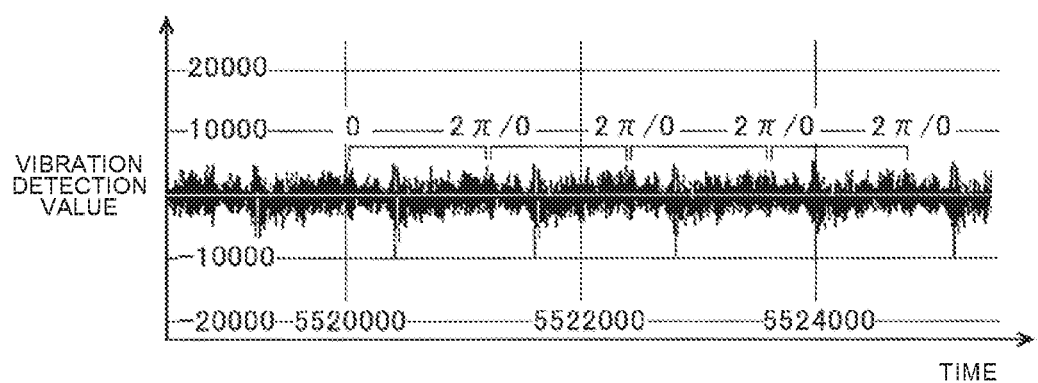
FIG. 10 is a graph showing the vibration detection value in the tangential direction T when the scroll-type compressor is degraded.
Figure 11:
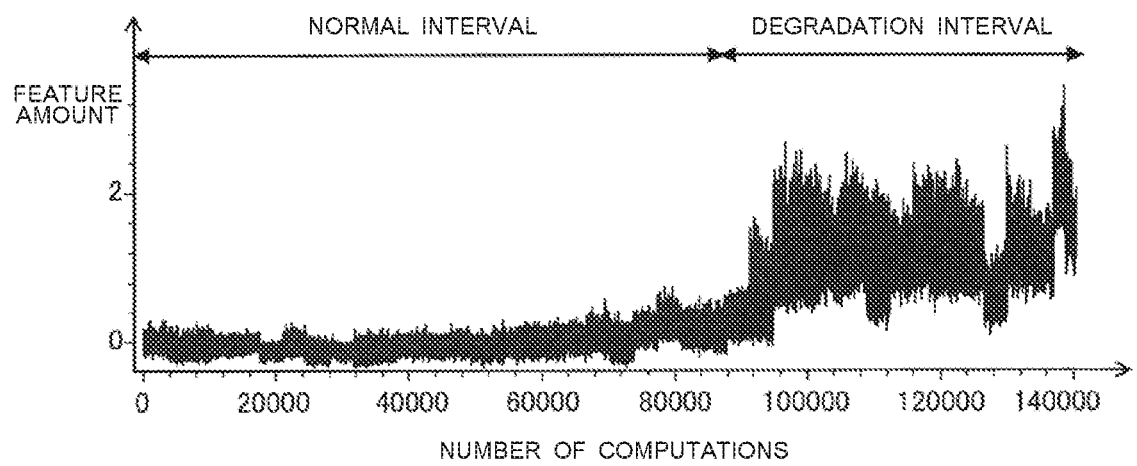
FIG. 11 is a graph showing a change in feature amount along with progress of degradation of the compressor.

FIG. 8 is a graph for showing the load torque when the scroll-type compressor is normal. FIG. 9 is a graph for showing the vibration detection value in the tangential direction T when the scroll-type compressor is normal. FIG. 10 is a graph for showing the vibration detection value in the tangential direction T when the scroll-type compressor is degraded. FIG. 11 is a graph for showing a change in feature amount along with the progress of degradation of the compressor. In FIG. 8, the horizontal axis represents the rotation angle [rad], whereas the vertical axis represents the load torque. In FIG. 9 and FIG. 10, the horizontal axis represents time, whereas the vertical axis represents the vibration detection value. Specifically, in FIG. 9 and FIG. 10, an amplitude of the vibrational acceleration detected by the first vibration sensor 12a is shown. In FIG. 11, the horizontal axis represents the number of computations, whereas the vertical axis represents the feature amount.

An influence of the compression mechanism unit 40 which performs the rotational motion or other motions greatly appears in the load torque pattern during one revolution. Therefore, as is understood from FIG. 8 and FIG. 9, the vibration of the compressor 100 in the tangential direction T and the load torque pattern have a high correlation.

For example, when oil at the sliding portion of the compression mechanism unit 40 is depleted to damage the sliding portion due to a decrease in oil return amount to the compressor 100, which is caused by the liquid backflow or oil loss through a piston cylinder, the vibration pattern in the tangential direction T changes, as shown in FIG. 10. Therefore, when the feature amount is computed with use of the first vibration detection value to digitize a shape of a vibrational waveform, the compressor 100 has a feature amount with a characteristic of having different values in a normal interval in which the compressor 100 operates normally and a degradation interval in which the compressor 100 operates in a degraded state, as shown in FIG. 11. A median and a standard deviation of a probability density distribution of the feature amount when the compressor 100 is normal and those when the compressor 100 is degraded are different. Specifically, at least one feature amount is selected in accordance with, for example, the type of the compressor 100, specifically, in accordance with a motion pattern of the movable component of the compression mechanism unit 40, and the selected feature amount is computed and analyzed. In this manner, whether the compressor 100 is normal or degraded can be determined. A crest value that is computed from the vibration detection value shown in FIG. 9 is 5, and a crest value that is computed from the vibration detection value shown in FIG. 10 falls within a range of from 7 to 8.

For the sliding portion of the compression mechanism unit 40 described above, configuration examples in the cases of the scroll-type compressor and the rotary-type compressor are now described with reference to FIG. 12 and FIG. 13.

Figure 12:
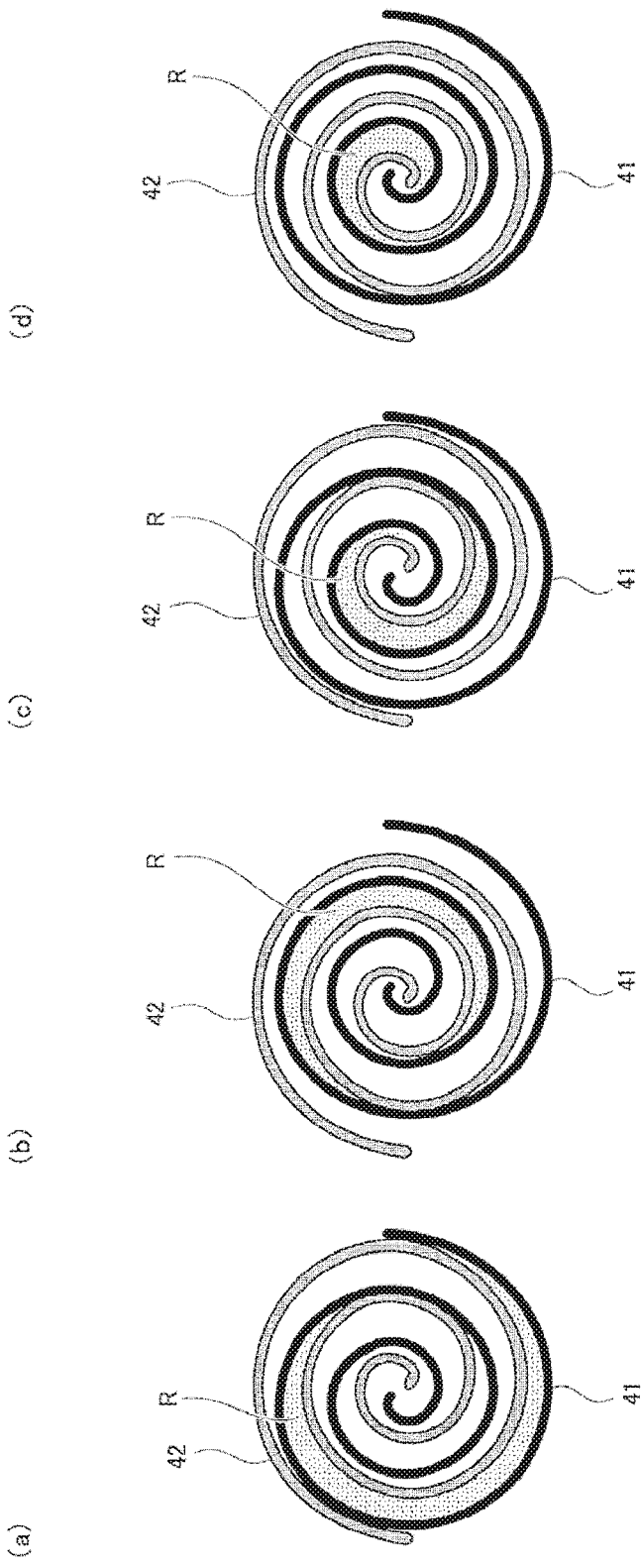
FIG. 12 are explanatory diagrams illustrating schematic cross sections of a compression mechanism unit of the scroll-type compressor.

FIG. 12 are explanatory diagrams illustrating schematic cross sections of the compression mechanism unit of the scroll-type compressor. With reference to FIGS. 12, movement of the compression mechanism unit 40 and the sliding portion of the compression mechanism unit 40 when the compressor 100 is the scroll-type compressor are described. As illustrated in FIGS. 12, the compression mechanism unit 40 includes a fixed scroll 41 having a fixed spiral body and an orbiting scroll 42 having an orbiting spiral body.

When the rotary shaft (not shown) of the compressor 100 is rotated, the orbiting scroll 42, which is coupled to the rotary shaft, starts rotating and starts compressing a refrigerant gas R in cooperation with the fixed scroll 41. Specifically, as illustrated in FIG. 12(a), the refrigerant gas R sucked from the suction pipe 101a flows into the shell 50 and is sucked into the compression mechanism unit 40 that is formed to include the fixed scroll 41 and the orbiting scroll 42. Subsequently, the orbiting scroll 42 performs a turning motion in the order of FIG. 12(b), FIG. 12(c), and FIG. 12(d) under a state in which part of a side surface thereof is held in contract with part of a side surface of the fixed scroll 41. In this manner, the compressed refrigerant gas R is exhausted from a discharge port (not shown) formed in a central portion of the fixed scroll 41 to be discharged outside of the shell 50 via the discharge pipe 100a.

As described above, in the compression mechanism unit 40 of the scroll-type compressor, the orbiting scroll 42 performs the turning motion along with the rotational motion of the rotary shaft. A portion at which the fixed scroll 41 and the orbiting scroll 42 are held in contact with each other changes along with the turning motion of the orbiting scroll 42. Therefore, the above-mentioned portion becomes the sliding portion.

Figure 13:
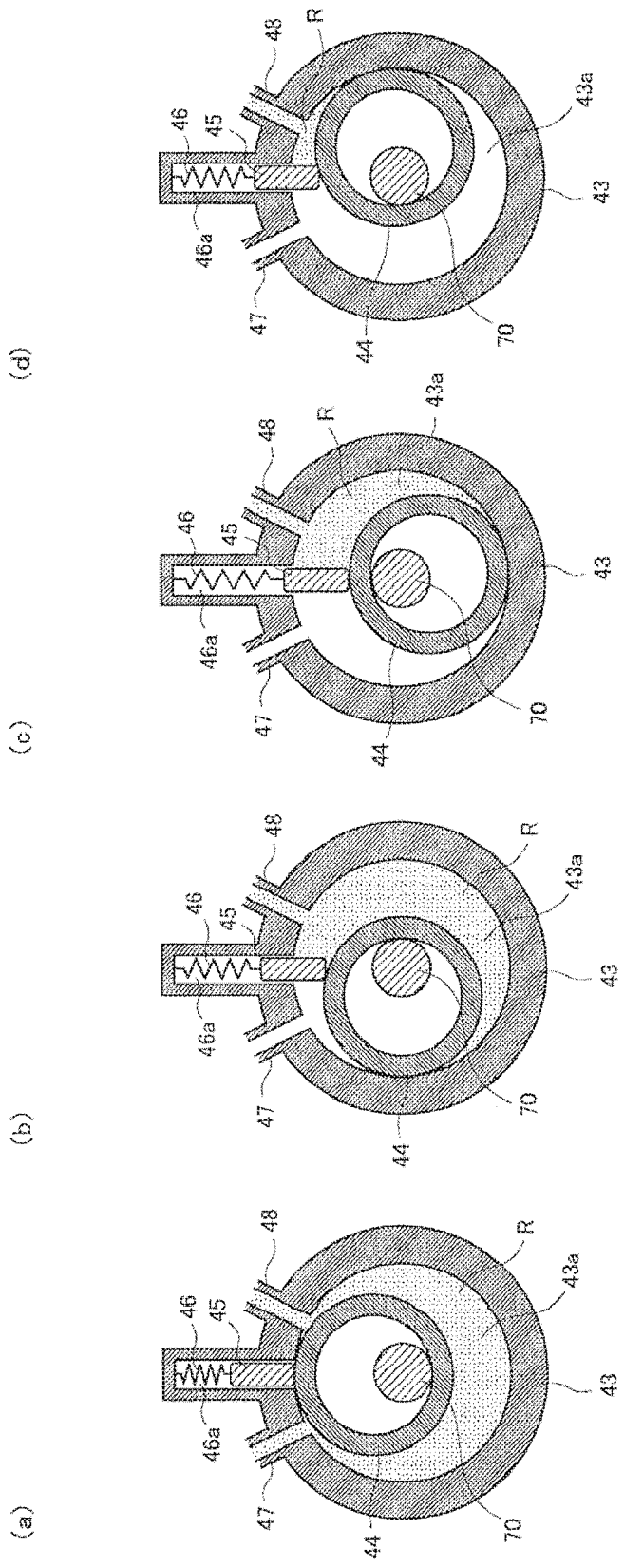
FIG. 13 are explanatory diagrams illustrating schematic cross sections of a compression mechanism unit of a rotary-type compressor.

FIG. 13 are explanatory diagrams illustrating schematic cross sections of the compression mechanism unit 40 of the rotary-type compressor. With reference to FIGS. 13, movement of the compression mechanism unit 40 and the sliding portion of the compression mechanism unit 40 when the compressor 100 is the rotary-type compressor are described.

As illustrated in FIGS. 13, the compression mechanism unit 40 includes a cylinder 43, a rolling piston 44, a vane 45, a vane spring 46, a suction port 47, and a discharge port 48. Inside the cylinder 43, a compression chamber 43a is formed, which is a cylindrical space having both ends in an axial direction of a rotary shaft 70 being open. The rolling piston 44 is provided inside the compression chamber 43a, and is rotated in close contact with an inner wall of the cylinder 43 along with a rotational motion of an eccentric portion of the rotary shaft 70. The vane 45 partitions a space formed by an inner wall of the compression chamber 43a and an outer wall of the rolling piston 44. The vane spring 46 is provided in a back pressure chamber 46a and is configured to press an end of the vane 45, which is located on a side closer to the compression chamber 43a, against the outer wall of the rolling piston 44.

In the compression mechanism unit 40, when the refrigerant gas R in the shell 50 flows into the back pressure chamber 46a via the suction port 47 as illustrated in FIG. 13(a), a pressure difference is generated between a pressure of the refrigerant gas R in the back pressure chamber 46a and a pressure of the refrigerant gas R in the compression chamber 43a. The vane 45 is moved toward a center of the compression chamber 43a by the pressure difference, and hence the end of the vane 45, which is located on the side close to the compression chamber 43a, abuts against the cylindrical outer wall of the rolling piston 44. Then, the rolling piston 44 is rotated in the order of FIG. 13(b), FIG. 13(c), and FIG. 13(d) under a state in which part of the outer wall thereof is held in contact with part of the inner wall of the cylinder 43 along with the rotational motion of the rotary shaft 70. In this manner, the compressed refrigerant gas R is exhausted from the discharge port 48 of the compression chamber 43a to be discharged outside of the shell 50 via the discharge pipe 100a.

As described above, in the compression mechanism unit 40 of the rotary-type compressor, the rolling piston 44 is rotated along with the rotational motion of the rotary shaft 70. A portion at which the inner wall of the cylinder 43 and the outer wall of the rolling piston 44 are held in contact with each other and a portion at which the end of the vane 45, which is located on the side closer to the compression chamber 43a, and the outer wall of the rolling piston 44 are held in contact with each other are shifted along with the rotation of the rolling piston 44. Each of the above-mentioned portions becomes the sliding portion.

As in the example described above, the compressor 100 has a different sliding portion based on the movement of the compression mechanism unit 40 and the rotational motion of the rotary shaft for each type, and the vibration detection value and the feature amount, which are useful for the degradation diagnosis, are also different. Specifically, for the degradation diagnosis, the vibration detection value in the tangential direction T is more useful for some compressors 100, and the vibration detection value in the circle center direction Co is more useful for other compressors 100. Therefore, for example, when performing the degradation diagnosis for the compressor 100 for which the vibration detection value in the tangential direction T is more useful as in the case of the scroll-type compressor which mainly performs the rotational motion, the vibration detection device 10 may include only the first vibration sensor 12a.

Meanwhile, when performing the degradation diagnosis for the compressor 100 for which the vibration detection value in the circle center direction Co is more useful, the vibration detection device 10 may include only the second vibration sensor 12b. The vibration detection device 10 may include a single biaxial acceleration sensor, which is configured to detect the vibrational acceleration in the tangential direction T and the vibrational acceleration in the circle center direction Co, in place of the first vibration sensor 12a and the second vibration sensor 12b each being a uniaxial acceleration sensor.

Although the vibration detection device 10, which is mounted to the shell 50 with the magnetic force of the magnet provided in the mounting portion 11, has been exemplified above, the mounting of the vibration detection device 10 is not limited thereto. For example, the mounting portion 11 may be fixed to the shell 50 by welding. The mounting portion 11 may be mounted to the shell 50 with, for example, an adhesive. In view of, for example, a decrease in cylindricity of the shell 50 due to the welding and durability of the adhesive, the configuration of fixing the mounting portion 11 to the shell 50 with the magnet is preferred.

Although FIG. 4 and FIG. 5 exemplify the case in which the xy cross section of each of the projecting portions 11b has a right triangular shape, the shape of the xy cross section of each of the projecting portions 11b is not limited thereto. The xy cross section of each of the projecting portions 11b may have an acute triangular shape or an obtuse triangular shape. Further, although FIG. 4 and FIG. 5 exemplify the case in which the two projecting portions 11b are continuously formed through the central portion 11e therebetween, the formation of the two projecting portions 11b is not limited thereto. A gap may be present between the two projecting portions 11b.

Further, each of the two projecting portions 11b may be formed of a plurality of projecting members arranged along the z-axis direction. For example, each of the plurality of projecting members may have a triangular prism shape, a pyramid shape, or a conical shape. In addition, each of the two projecting portions 11b may be formed by a combination of at least two of the triangular prism shaped projecting member, the pyramid shaped projecting member, and the conical projecting member. In this manner, when the two projecting portions 11b are brought into contact with the shell 50 under a state in which a gap is defined between the projecting members, each of the plurality of projecting members is held in linear contact or point contact with the outer wall of the shell 50. Specifically, a portion, which is not held in contact with the outer wall of the shell 50, is present on each of the projecting members, and dew condensation generated on the surface of the compressor 100 flows from the above-mentioned portion. Therefore, the adhesion of dew condensation to the first vibration sensor 12a and the second vibration sensor 12b can be more reliably prevented.

Modification Example 1-1

Figure 14:
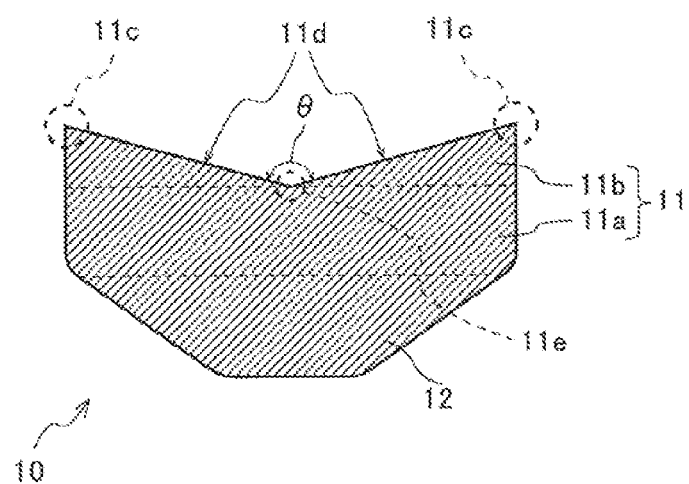
FIG. 14 is a schematic sectional view illustrating a state in which a vibration detection device of Modification Example 1-1 of Embodiment 1 of the present invention is taken along the xy plane.

FIG. 14 is a schematic sectional view illustrating a state in which a vibration detection device of Modification Example 1-1 of Embodiment 1 of the present invention is taken along the xy plane. As illustrated in FIG. 14, the sensor holding unit 12 may be connected to an entire surface of the base portion 11a, which is located on a side opposite to the projecting portions 11b. The sensor holding unit 12 may be formed to have a trapezoidal cross section along the xy plane.

Modification Example 1-2

Figure 15:
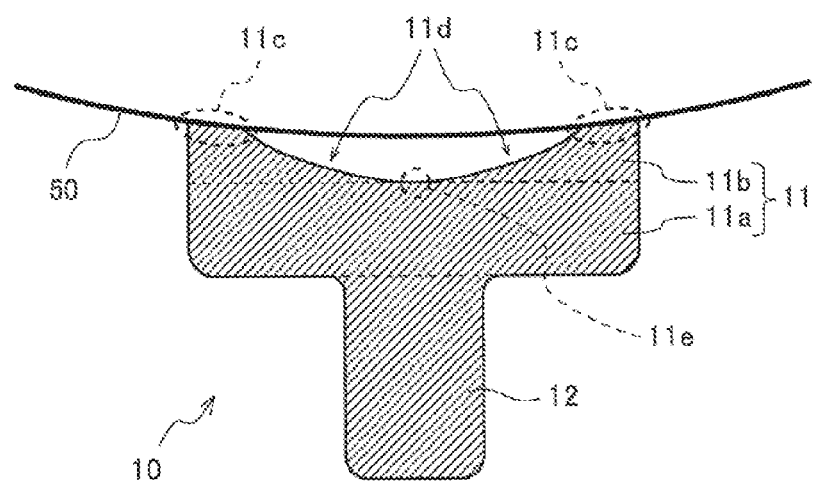
FIG. 15 is a schematic sectional view illustrating a state in which a vibration detection device of Modification Example 1-2 of Embodiment 1 of the present invention is taken along the xy plane.

FIG. 15 is a schematic sectional view illustrating a state in which a vibration detection device of Modification Example 1-2 of Embodiment 1 of the present invention is taken along the xy plane. As illustrated in FIG. 15, the vibration detection device 10 may be manufactured exclusively for the compressor 100 including the shell 50 having a predetermine curvature. Specifically, each of the distal end portions 11c of the two projecting portions 11b may have a contact surface having a curvature that matches a curvature of the specific shell 50 so that each of the contact surfaces abuts against the shell 50. In this manner, a fixing force of the projecting portions 11b to the shell 50 can be enhanced, and hence the vibration detection device 10 can be more stably fixed to the shell 50. Further, with the inner wall 11d of each of the two projecting portions 11b, each of the two projecting portions 11b may form a curved surface which is curved toward the central portion 11e.

Figure 16:
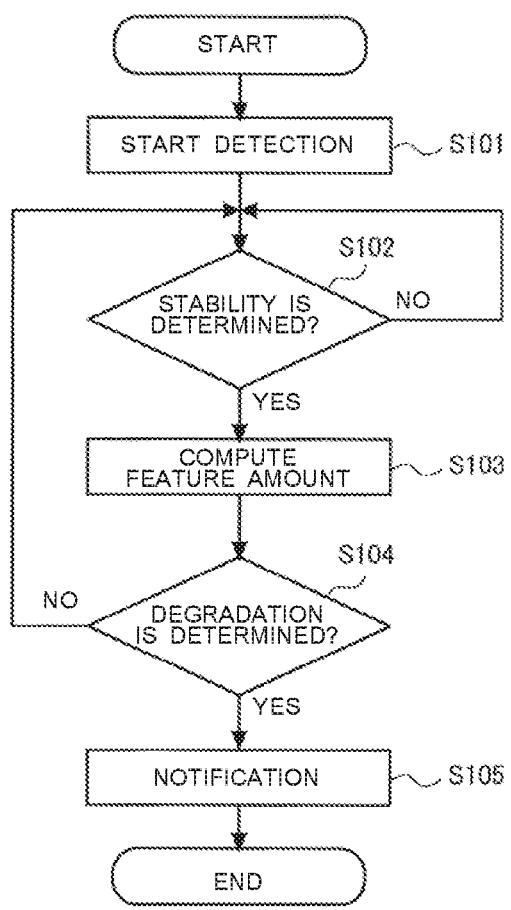
FIG. 16 is a flowchart illustrating an operation example of the degradation diagnostic device of FIG. 1.

FIG. 16 is a flowchart illustrating an operation example of the degradation diagnostic device of FIG. 1. Degradation diagnostic processing for the compressor 100, which is performed by the degradation diagnostic device 30, is described with reference to FIG. 16. In this case, there is described an operation example in which the degradation diagnosis for the compressor 100 is performed by the degradation diagnostic device 30 with use of both of the vibration detection value detected by the first vibration sensor 12a and the vibration detection value detected by the second vibration sensor 12b.

First, the detection of the vibrational acceleration in the tangential direction T by the first vibration sensor 12a and the detection of the vibrational acceleration in the circle center direction Co by the second vibration sensor 12b are started (Step S101). Then, the stability determining unit 22 acquires the vibrational accelerations respectively detected by the first vibration sensor 12a and the second vibration sensor 12b and determines whether or not the state of the air-conditioning apparatus 200 has become stable based on the acquired vibrational accelerations (Step S102).

Specifically, the feature amount computing unit 23 waits until the state of the air-conditioning apparatus 200 becomes stable (Step S102/No). Then, when the stability determining unit 22 determines that the state of the air-conditioning apparatus 200 has become stable (Step S102/Yes), the feature amount computing unit 23 acquires the vibrational accelerations detected by the first vibration sensor 12a and the second vibration sensor 12b. Then, the feature amount indicative of the state of the compressor 100 is computed with use of the acquired vibrational accelerations (Step S103).

Subsequently, the degradation determining unit 24 determines whether or not the compressor 100 is degraded based on the feature amount computed in the feature amount computing unit 23 (Step S104). When the compressor 100 is not degraded (Step S104/No), the degradation determining unit 24 returns to Step S102 without performing any processing. Meanwhile, when determining that the compressor 100 is degraded (Step S104/Yes), the degradation determining unit 24 outputs information about the degradation to the notification processing unit 25 and the operation switching processing unit 26. The notification processing unit 25 notifies the information about the degradation, which is output from the degradation determining unit 24. Specifically, the notification processing unit 25 executes, for example, display processing for the display unit 400 or transmission processing to the remote monitoring source. When the information about the degradation is output from the degradation determining unit 24, the operation switching processing unit 26 transmits the life extension operation command to the controller 300. In this manner, the operation switching processing unit 26 switches a control state of the compressor 100 to the life extension operation control (Step S105).

As described above, in the degradation diagnostic device 30 according to Embodiment 1, the sensor holding unit 12 including at least one of the first vibration sensor 12a and the second vibration sensor 12b is formed integrally with the two projecting portions 11b that are arranged on the outer wall of the shell 50 at the position at which the compression mechanism unit 40 is located. Therefore, the vibration caused by, for example, the rotational motion of the compression mechanism unit 40 can be detected by the vibration sensor with high accuracy. Thus, a highly accurate degradation diagnosis for the compressor 100 can be performed. Specifically, with the degradation diagnostic device 30, accuracy of determination of a nondestructive abnormality diagnosis for the sliding portion of the compression mechanism unit 40 can be increased.

Further, each of the projecting portions 11b has a width in the y-axis direction, which decreases toward the distal end portion 11c, and the distal end portion 11c is held in contact with the shell 50. Specifically, the distal end portion 11c of each of the plurality of projecting portions 11b is formed so as to be held in contact with the outer wall of the shell 50 along the axial direction of the rotary shaft. Thus, each of the distal end portions 11c of the two projecting portions 11b can be brought into linear contact with the surface of the shell 50, which is formed as the curved surface. Therefore, the vibration detection device 10 can be easily installed so that the longitudinal direction of the mounting portion 11 becomes parallel to the axial direction of the rotary shaft. Therefore, the vibration detection direction of the vibration sensor can be stabilized. Further, the distal end portion 11c of each of the two projecting portions 11b can be brought into contact with and fixed to the compressor 100 including the shell 50 having every curvature along the axial direction of the rotary shaft. Further, the contact portions between the projecting portions 11b and the shell 50 can be reduced. Thus, the intrusion of the dew condensation generated on the surface of the compressor 100 into the vibration sensors can be prevented.

Each of the two projecting portions 11b includes the magnet, or is formed of the magnet. Therefore, the vibration detection device 10 can be stably fixed over a long time period without reducing the cylindricity of the shell 50. The vibration detection device 10 can be easily removed from and mounted onto the shell 50. Thus, under a condition that the vibration detection device 10 is fixed to the shell 50 only at the time of a regular inspection of the compressor 100, convenience can be improved.

The diagnostic processing device 20 can use the feature amount that is optimal for the vibration pattern based on the motion of the movable component of the compression mechanism unit 40 for the degradation determination for the compressor 100. Thus, the damage of the compressor 100 or other failures can be detected with high accuracy. Further, the diagnostic processing device 20 can detect even a sign of a minor failure of the compressor 100 with high accuracy by finely adjusting the feature amount and the degradation threshold value.

When the vibration detection direction of the vibration sensor and the operating direction of the movable component of the compression mechanism unit 40 do not match each other, detection processing becomes complicated. In contrast, each of the first vibration sensor 12a and the second vibration sensor 12b of Embodiment 1 is arranged so as to match the operating direction of the movable component of the compression mechanism unit 40. Thus, the detection processing can be prevented from being complicated. Further, in a case in which the vibration sensor is arranged as in Patent Literature 1 and Patent Literature 2, a highly accurate vibration detection value cannot be obtained when the movable component of the compression mechanism unit 40 is complex. In contrast, each of the first vibration sensor 12a and the second vibration sensor 12b of Embodiment 1 is arranged on the outer wall of the shell 50 at the position at which the compression mechanism unit 40 is located so as to match the operating direction of the movable component of the compression mechanism unit 40. Thus, a highly accurate vibration detection value can be obtained. Specifically, with the degradation diagnostic device 30, even when the movable component of the compression mechanism unit 40 is complicated, the damage of the sliding portion of the compression mechanism unit 40 or other failures can be diagnosed with high accuracy.

Embodiment 2

Figure 17:
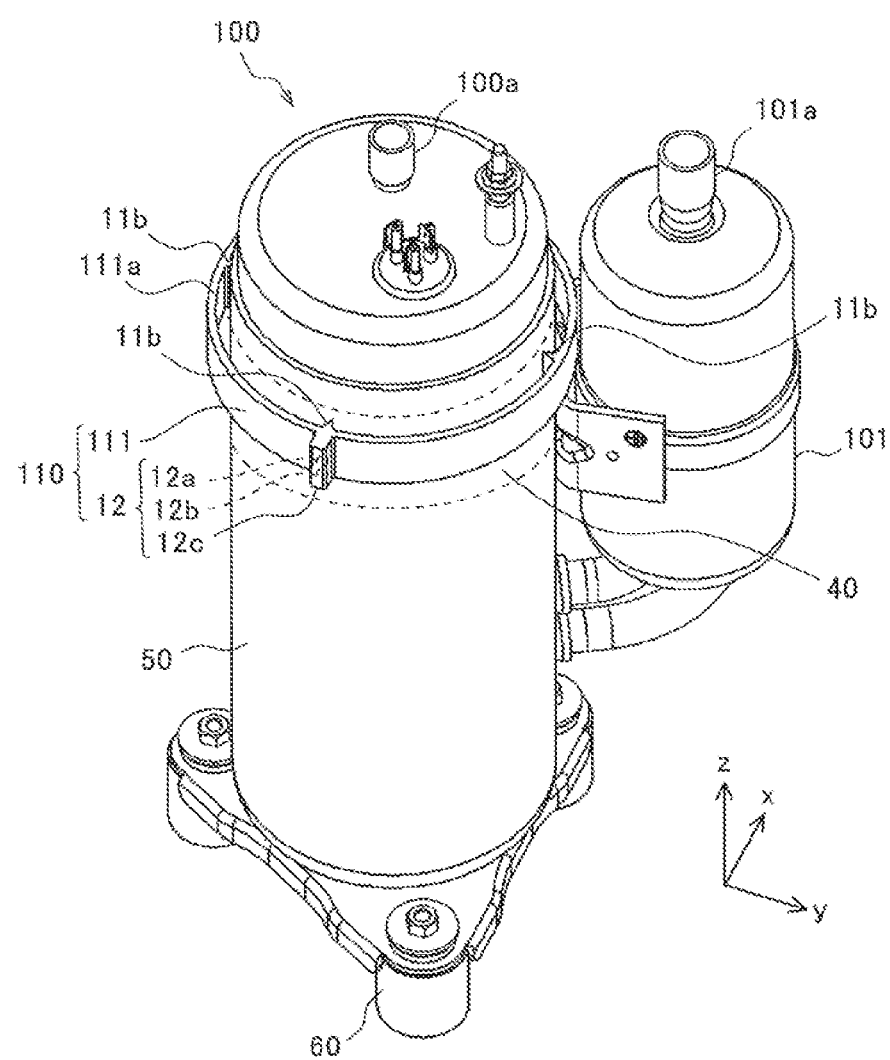
FIG. 17 is an external view illustrating a compressor and a vibration detection device of Embodiment 2 of the present invention.
Figure 18:
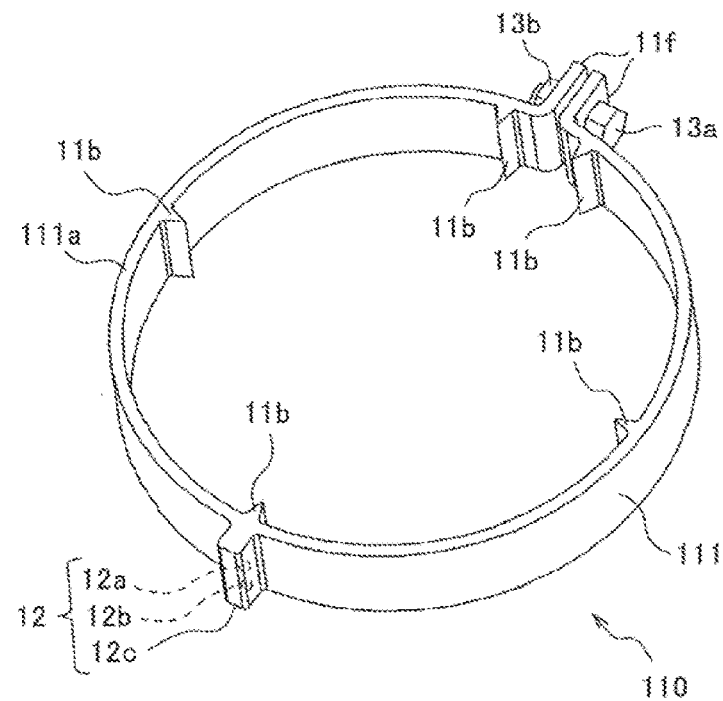
FIG. 18 is a perspective view illustrating the vibration detection device of FIG. 17 in an enlarged manner.

FIG. 17 is an external view illustrating a compressor and a vibration detection device of Embodiment 2 of the present invention. FIG. 18 is a perspective view illustrating the vibration detection device of FIG. 17 in an enlarged manner. A configuration of the vibration detection device of Embodiment 2 is described with reference to FIG. 17 and FIG. 18. Components equivalent to or corresponding to those of Embodiment 1 described above are denoted by the same reference symbols, and description thereof is herein omitted.

The degradation diagnostic device 30 according to Embodiment 2 includes a vibration detection device 110 and the diagnostic processing device 20, and, as in Embodiment 1, is fixed to the compressor 100 of the air-conditioning apparatus 200 as exemplified in FIG. 1 for use. The vibration detection device 110 is formed into a band-like shape and is configured to be wound around the shell 50 so as to be fixed thereto. More specifically, a base portion 111a of a mounting portion 111 is formed into an annular shape that surrounds the outer wall of the shell 50. The mounting portion 111 has two fastening portions 11f to be fastened with a bolt 13a and a nut 13b. Each of the two fastening portions 11f has a through hole (not shown) that allows the bolt 13a to pass therethrough.

Further, the mounting portion 111 has five projecting portions 11b. One of the mounting portions 111 is arranged so as to be opposed to the two fastening portions 11f, which are in a state of being fastened with the bolt 13a and the nut 13b. The projecting portions 11b are respectively formed at positions adjacent to the two fastening portions 11f. Two of the mounting portions 111 are arranged so as to be opposed to each other. The projecting portion 11b, which is arranged so as to be opposed to the two fastening portions 11f, the two projecting portions 11b, which are respectively formed at the positions adjacent to the fastening portions 11f, and the two projecting portions 11b, which are arranged so as to be opposed to each other, are disposed at approximately equal intervals on a curved surface of the base portion 111a, which is located on a side opposite to the sensor holding unit 12. It is apparent that at least one of the five projecting portions 11b may have a rounded smooth shape.

The sensor holding unit 12 is formed so as to be aligned with one of the plurality of projecting portions 11b in a diametrical direction of the base portion 111a formed into the annular shape. In an example of FIG. 18, the sensor holding unit 12 is aligned with the projecting portion 11b, which is arranged so as to be opposed to the two fastening portions 11f, in the diametrical direction of the base portion 111a. The remaining configuration of the vibration detection device 110 is the same as that of the above-mentioned vibration detection device 10 of Embodiment 1.

In this case, the vibration detection device 110 and the diagnostic processing device 20 may be formed integrally. Specifically, the diagnostic processing device 20 may be provided to the base portion 111a or to the sensor holding unit 12. The base portion 111a is desired to include a power supply unit, which is configured to supply power to the vibration detection device 110 and the diagnostic processing device 20. In this manner, the degradation diagnostic device 30 may be operated alone. When the communication processing unit 25b has a wireless communication function, the diagnostic processing device 20 can wirelessly transmit, for example, the feature amount or the result of degradation determination to the external communication device.

Modification Example 2-1

Figure 19:
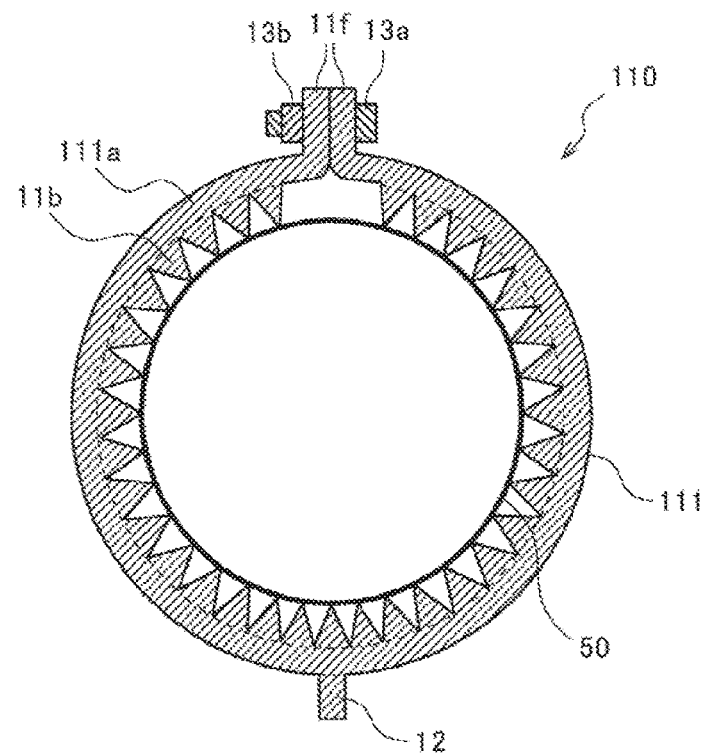
FIG. 19 is a schematic sectional view illustrating a state in which a vibration detection device of Modification Example 2-1 of Embodiment 2 of the present invention is taken along the xy plane.

FIG. 19 is a schematic sectional view illustrating a state in which a vibration detection device of Modification Example 2-1 of Embodiment 2 of the present invention is taken along the xy plane. As illustrated in FIG. 19, the vibration detection device 110 may have the projecting portions 11b on a large part of the curved surface of the base portion 111a, which is located on the side opposite to the sensor holding unit 12. In this manner, contact portions with the shell 50 increase, and hence the fixing force to the shell 50 can be enhanced. It is apparent that each of the plurality of projecting portions 11b may have a rounded shape having, for example, a semi-cylindrical xy cross section. The mounting portion 111 may be formed of a combination of the projecting portions 11b each having a rounded shape and the projecting portions 11b each having a pointed distal end portion.

Modification Example 2-2

Figure 20:
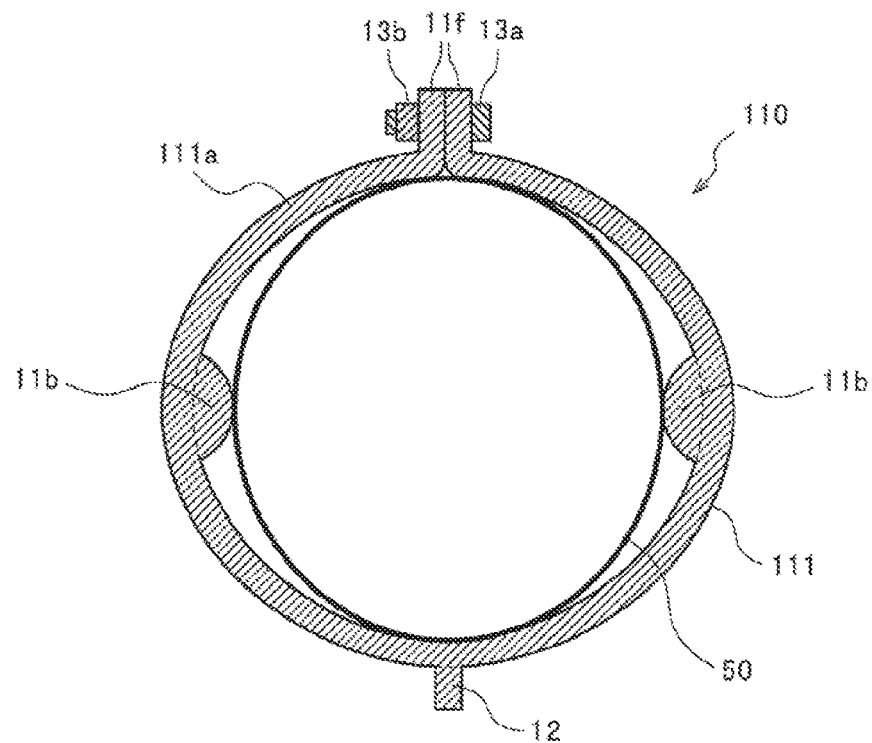
FIG. 20 is a schematic sectional view illustrating a state in which a vibration detection device of Modification Example 2-2 of Embodiment 2 of the present invention is taken along the xy plane.

FIG. 20 is a schematic sectional view illustrating a state in which a vibration detection device of Modification Example 2-2 of Embodiment 2 of the present invention is taken along the xy plane. As illustrated in FIG. 20, the vibration detection device 110 has two projecting portions 11b, which are arranged so as to be opposed to each other. A distal end portion of each of the two projecting portions 11b, a portion of the base portion 111a, which is on the periphery of the two fastening portions 11f, and a portion of the base portion 111a, which is on the periphery of the sensor holding unit 12, are configured to be held in contact with the shell 50. Even in this manner, the vibration detection device 110 is stably fixed to the shell 50.

Although FIG. 20 exemplifies the configuration in which the sensor holding unit 12 is arranged at the position opposed to the two fastening portions 11f, the sensor holding unit 12 may be formed so as to be aligned with one of the two projecting portions 11b in the diametrical direction of the base portion 111a. In this manner, the dew condensation generated on the surface of the compressor 100 flows down from a portion of the shell 50, which is not held in contact with the projecting portions 11b. Therefore, the adhesion of the dew condensation to the sensor holding unit 12 can be further prevented. Although the two projecting portions 11b each having a rounded shape are exemplified in FIG. 20, at least one of the two projecting portions 11b may have a pointed distal end portion.

Modification Example 2-3

Figure 21:
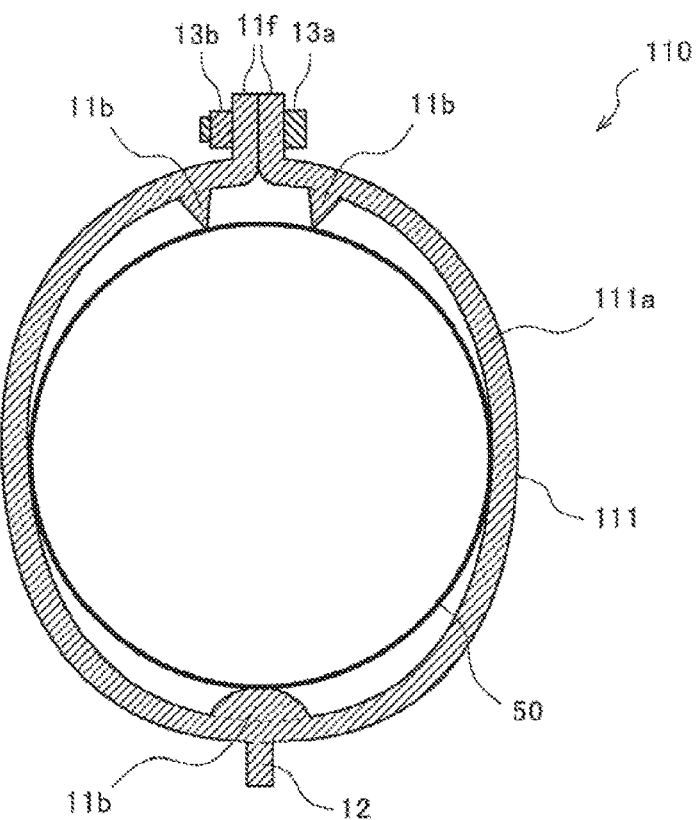
FIG. 21 is a schematic sectional view illustrating a state in which a vibration detection device of Modification Example 2-3 of Embodiment 2 of the present invention is taken along the xy plane.

FIG. 21 is a schematic sectional view illustrating a state in which a vibration detection device of Modification Example 2-3 of Embodiment 2 of the present invention is taken along the xy plane. As illustrated in FIG. 21, the mounting portion 111 has the single projecting portion 11b, which has a rounded shape and is arranged so as to be opposed to the two fastening portions 11f. The projecting portions 11b each having a pointed distal end portion are formed at positions respectively adjacent to the two fastening portions 11f of the mounting portion 111. The single projecting portion 11b, which is arranged so as to be opposed to the two fastening portions 11f, may have a pointed distal end portion, whereas each of the projecting portions 11b, which are respectively formed at the positions adjacent to the two fastening portions 11f, may have a rounded distal end portion.

Although FIG. 18 to FIG. 21 exemplify the case in which the vibration detection device 110 is fixed to the shell 50 by a fixing unit including the fastening portions 11f, the bolt 13a, and the nut 13b, the fixing unit is not limited thereto. Other general-purpose fixing units can be used as the fixing unit.

As described above, in the degradation diagnostic device 30 according to Embodiment 2, the sensor holding unit 12 including at least one of the first vibration sensor 12a and the second vibration sensor 12b is formed integrally with the plurality of projecting portions 11b that are fixed to the shell 50. Therefore, the vibration caused by, for example, the rotational motion of the compression mechanism unit 40 can be detected by the vibration sensor with high accuracy. Thus, a highly accurate degradation diagnosis for the compressor 100 can be performed.

Further, the base portion 111a is formed into the annular shape that surrounds the outer wall of the shell 50. Therefore, the vibration detection device 110 can be stably fixed to the shell 50. Further, the sensor holding unit 12 is formed so as to be aligned with one of the plurality of projecting portions 11b in the diametrical direction of the base portion 111a. Therefore, the vibration transmitted from the compression mechanism unit 40 can be directly detected by the vibration sensors. Thus, the highly accurate vibration detection values can be acquired. Other effects are the same as those of Embodiment 1 described above.

Each of the embodiments described above is a suitable specific example for the degradation diagnostic device and the air-conditioning apparatus, and a technical scope of the present invention is not limited to the above-mentioned modes. For example, each of the functions of the diagnostic processing device 20 may be partially or entirely incorporated into the controller 300. Further, the air-conditioning apparatus 200 may include two controllers in which the functions of the controller 300 are separately provided in place of the controller 300. In this case, one of the controllers may be provided to the outdoor unit 200A, whereas another of the controllers may be provided to the indoor unit 200B.

The air-conditioning apparatus 200 may include a remote controller for operation, which is connected to the controller 300 in a wired or wireless manner. The display unit 400 may be provided to the remote controller instead of being provided to the indoor unit 200B. The pressure reducing device 105 is not limited to the electric expansion valve and may be any devices having a function of reducing a pressure of the refrigerant, for example, a capillary tube. The pressure reducing device 105 may be provided to the indoor unit 200B.

Although the application of the vibration detection devices 10 and 110 to the compressor of the air-conditioning apparatus has been exemplified in each of the embodiments described above, the application of the vibration detection devices is not limited thereto. The vibration detection devices 10 and 110 can be applied to compressors for, for example, a refrigerating machine, a freezing display case, a refrigerated display case, and a chiller.

The invention claimed is:

1. A degradation diagnostic device configured to perform a diagnosis for degradation of a compressor comprising a compression mechanism unit to be driven along with a rotational motion of a rotary shaft and a shell forming an outer casing, the degradation diagnostic device comprising a vibration detection device to be fixed onto an outer wall of the shell at a position at which the compression mechanism unit is located,
wherein the vibration detection device includes:
a vibration sensor configured to detect vibration of the compressor;
a sensor holding unit including the vibration sensor embedded therein, the vibration sensor being arranged in the sensor holding unit so that an acceleration axis of the vibration sensor is arranged in the sensor holding unit at a right angle to an axial direction of the rotary shaft (i) along a tangential direction of the compression mechanism unit so as to detect vibration along the tangential direction of the compressor, the tangential direction being a direction of a tangent of a rotation trajectory of the compression mechanism unit, or (ii) along a circle center direction of the compression mechanism unit so as to detect vibration along the circle center direction of the compressor, the circle center direction being a direction from the outer wall toward a center of the compression mechanism unit;
a base portion including a first surface and a second surface on a side of the base portion opposite to the first surface, the sensor holding unit is connected to the first surface; and
a plurality of projecting portions formed on the second surface of the base portion,
the plurality of projecting portions each have distal end portions which are distal to the second surface and which are held in linear contact with the outer wall of the shell along the axial direction of the rotary shaft, each of the distal end portions having a linear shape along the axial direction of the rotary shaft, and
the sensor holding unit including the vibration sensor being formed integrally with the plurality of projecting portions, the vibration sensor being offset distally from a point of contact of the plurality of projecting portions with the outer wall of the shell, so as to sense vibrations tangential to a rotation axis of the rotary shaft.

2. The degradation diagnostic device of claim 1,
wherein the plurality of projecting portions comprise two projecting portions, and
wherein each of the two projecting portions includes a magnet.

3. The degradation diagnostic device of claim 1,
wherein the plurality of projecting portions comprise two projecting portions, and
wherein each of the two projecting portions is formed of a magnet.

4. The degradation diagnostic device of claim 1 wherein the base portion is formed into an annular shape that surrounds the outer wall.

5. The degradation diagnostic device of claim 4, wherein the sensor holding unit is formed so as to be aligned with one of the plurality of projecting portions in a diametrical direction of the base portion.

6. The degradation diagnostic device of claim 1,
wherein an operating direction of a movable component of the compression mechanism unit comprises the tangential direction, and
wherein the vibration sensor is arranged so that a vibration detection direction matches the tangential direction.

7. The degradation diagnostic device of claim 1,
wherein an operating direction of a movable component of the compression mechanism unit comprises the tangential direction and the circle center direction, and
wherein the vibration detection device comprises, as the vibration sensor;
a first vibration sensor, which is arranged so that a vibration detection direction matches the tangential direction; and
a second vibration sensor, which is arranged so that the vibration detection direction matches the circle center direction.

8. The degradation diagnostic device of claim 1,
wherein an operating direction of a movable component of the compression mechanism unit comprises the tangential direction and the circle center direction, and
wherein a vibration detection direction of the vibration sensor comprises two vibration detection directions, and the vibration sensor is arranged so that one of the vibration detection directions matches the tangential direction and another of the vibration detection directions matches the circle center direction.

9. The degradation diagnostic device of claim 1, further comprising a diagnostic processing device, which is configured to perform the diagnosis for the degradation of the compressor based on a detection value obtained by the vibration sensor,
wherein the diagnostic processing device comprises:
a feature amount computing unit, which is configured to compute a feature amount indicative of a state of the compressor based on a detection value obtained by the vibration sensor;
a degradation determining unit configured to determine a kind of degradation and a degree of degradation of the compressor based on the feature amount computed in the feature amount computing unit; and
a notification processing unit configured to notify information indicative of a result of the determination performed by the degradation determining unit.

10. The degradation diagnostic device of claim 9, wherein the notification processing unit has a function of transmitting the information indicative of the result of the determination performed by the degradation determining unit to an external device through wireless communication.

11. The degradation diagnostic device of claim 9, wherein the vibration detection device and the diagnostic processing device are formed integrally.

12. An air-conditioning apparatus, comprising:
a refrigeration cycle, through which refrigerant circulates, the refrigeration cycle being formed by connecting, by a refrigerant pipe, a compressor, which includes a compression mechanism unit to be driven along with a rotational motion of a rotary shaft and is configured to compress the refrigerant, a heat source-side heat exchanger, which is configured to exchange heat between a heat medium and the refrigerant, a pressure reducing device, which is configured to regulate a flow rate of the refrigerant, and a use-side heat exchanger, which is configured to exchange heat between an indoor air and the refrigerant; and
the degradation diagnostic device of claim 1.

13. The degradation diagnostic device of claim 1,
wherein, in a sectional view of the vibration detection device taken along a plane perpendicular to the rotary shaft,
an entirety of the vibration detection device between the distal end portions of the plurality of projecting portions does not contact with the outer wall of the shell.

14. A degradation diagnostic device configured to perform a diagnosis for degradation of a compressor comprising a compression mechanism unit to be driven along with a rotational motion of a rotary shaft and a shell forming an outer casing, the degradation diagnostic device comprising a vibration detection device to be fixed onto an outer wall of the shell at a position at which the compression mechanism unit is located,
wherein the vibration detection device includes:
a vibration sensor configured to detect vibration of the compressor;
a sensor holding unit including the vibration sensor embedded therein, the vibration sensor being arranged in the sensor holding unit so that an acceleration axis of the vibration sensor is arranged in the sensor holding unit at a right angle to an axial direction of the rotary shaft (i) along a tangential direction of the compression mechanism unit so as to detect vibration along the tangential direction of the compressor, the tangential direction being a direction of a tangent of a rotation trajectory of the compression mechanism unit, or (ii) along a circle center direction of the compression mechanism unit so as to detect vibration along the circle center direction of the compressor, the circle center direction being a direction from the outer wall toward a center of the compression mechanism unit;
a base portion including a first surface and a second surface on a side of the base portion opposite to the first surface, the sensor holding unit is connected to the first surface; and
a plurality of projecting portions formed on the second surface of the base portion and are brought into contact with the outer wall, each of the projecting portions having a linear shape along the axial direction of the rotary shaft,
wherein the sensor holding unit including the vibration sensor being formed integrally with the plurality of projecting portions, the vibration sensor being offset distally from a point of contact of the plurality of projecting portions with the outer wall of the shell, so as to sense vibrations tangential to a rotation axis of the rotary shaft, and
wherein the base portion is formed into an annular shape that surrounds the outer wall.

15. The degradation diagnostic device of claim 14, wherein
the plurality of projecting portions each have distal end portions which are distal to the second surface and which are held in linear contact with the outer wall of the shell along the axial direction of the rotary shaft.

16. The degradation diagnostic device of claim 14,
wherein each of the projecting portions includes a magnet.

17. The degradation diagnostic device of claim 14, wherein the sensor holding unit is formed so as to be aligned with one of the plurality of projecting portions in a diametrical direction of the base portion.

18. The degradation diagnostic device of claim 14,
wherein an operating direction of a movable component of the compression mechanism unit comprises the tangential direction, and
wherein the vibration sensor is arranged so that a vibration detection direction matches the tangential direction.

19. The degradation diagnostic device of claim 14,
wherein an operating direction of a movable component of the compression mechanism unit comprises the tangential direction and the circle center direction, and
wherein the vibration detection device comprises, as the vibration sensor;
a first vibration sensor, which is arranged so that a vibration detection direction matches the tangential direction; and
a second vibration sensor, which is arranged so that the vibration detection direction matches the circle center direction.

20. The degradation diagnostic device of claim 14,
wherein, in a sectional view of the vibration detection device taken along a plane perpendicular to the rotary shaft,
an entirety of the vibration detection device between the distal end portions of the plurality of projecting portions does not contact with the outer wall of the shell.

* * * * *